(12) United States Patent
Trim et al.

(10) Patent No.: US 10,204,592 B1
(45) Date of Patent: Feb. 12, 2019

(54) CONFIGURING MULTIPLE DISPLAYS OF A COMPUTING DEVICE TO HAVE A SIMILAR PERCEIVED APPEARANCE

(71) Applicant: Dell Products L. P., Round Rock, TX (US)

(72) Inventors: James Damon Trim, Pflugerville, TX (US); Jace W. Files, Round Rock, TX (US); John Trevor Morrison, Round Rock, TX (US); Preeth K. Srinivasan, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/826,859

(22) Filed: Nov. 30, 2017

(51) Int. Cl.
```
G09G 5/06    (2006.01)
G06F 3/14    (2006.01)
H04N 1/60    (2006.01)
G06F 1/16    (2006.01)
```

(52) U.S. Cl.
CPC ............. *G09G 5/06* (2013.01); *G06F 1/1601* (2013.01); *G06F 3/1423* (2013.01); *H04N 1/6005* (2013.01); *G09G 2320/041* (2013.01); *G09G 2320/0673* (2013.01); *G09G 2356/00* (2013.01); *G09G 2360/04* (2013.01); *G09G 2360/144* (2013.01)

(58) Field of Classification Search
CPC .............. G09G 5/06; G09G 2360/144; G09G 2356/00; G09G 2360/04; G09G 2320/041; G09G 2320/0673; G09G 2320/0686; G06F 1/1601; G06F 3/1423; H04N 1/6005
See application file for complete search history.

(56) References Cited

U.S. PATENT DOCUMENTS

| | | | |
|---|---|---|---|
| 2005/0146845 A1* | 7/2005 | Moscovitch | B60R 11/02 361/679.27 |
| 2007/0229423 A1* | 10/2007 | Tyrrell | G09G 3/3622 345/89 |
| 2009/0160878 A1* | 6/2009 | Kwong | G09G 5/00 345/690 |
| 2011/0211127 A1* | 9/2011 | Kelvin | G09G 3/3611 348/687 |
| 2017/0075640 A1* | 3/2017 | Chun | G06F 3/1446 |

* cited by examiner

*Primary Examiner* — Amit Chatly
(74) *Attorney, Agent, or Firm* — Campbell Stephenson LLP; Shiv S. Naimpally

(57) ABSTRACT

In some examples, a computing device includes a first display device coupled to a second display device by hinges. After determining that the computing device has been moved from a first orientation to a second orientation, the computing device may receive ambient light data from ambient light sensors associated with the first and second display device, temperature data from temperature sensors associated with the first and second display device, and color data from color sensors associated with the first and second display device. After determining that power is being received from an external power source or that the user prefers the display devices may be color matched, the computing device may perform one or more color adjustments based on the ambient light data, the temperature data, and the color data, thereby reducing a difference in a perceived color between the first display device and the second display device.

20 Claims, 12 Drawing Sheets

CONFIGURING MULTIPLE DISPLAYS OF A COMPUTING DEVICE TO HAVE A SIMILAR PERCEIVED APPEARANCE

BACKGROUND OF THE INVENTION

Field of the Invention

This invention relates generally to computing devices and, more particularly, to providing a same perceived appearance (e.g., in terms of color balance) among multiple display devices of a portable computing device that includes two (or more) display devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An operating system may enable multiple display devices to be configured as a single extended display device. For example, in an extended display mode, content (e.g., an application, a movie, or another type of content) may be displayed across multiple display devices. For a user, the content being displayed across the multiple display devices may appear disjointed if the perceived colors displayed by one display device differs from the perceived colors displayed by at least one of the other display devices. This may be due to several reasons, including variations that are within manufacturing tolerances and ambient lighting. For example, depending on where a light source is located, a first display device may receive direct light while a second display device may receive indirect light, causing a difference in the perceived colors displayed by the two display devices. As another example, in some situations, the first display device may receive light from a first light source and the second display device may receive light from a second light source. To illustrate, when a user is sitting near a window inside a building (e.g., home or workplace), the first light source may be the lighting used in the building (e.g., incandescent, fluorescent, or another type of lighting) while the second light source may be sunlight filtered through the window. The two different light sources may cause the user to perceive color variations, particular when content is being displayed across both display devices and one display device receives light primarily from the first light source while the other display device receives light primarily from the second light source.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device includes a first display device coupled to a second display device by one or more hinges (or other mechanical coupling). After determining that the computing device has been moved from a first orientation to a second orientation, the computing device may receive ambient light data from ambient light sensors associated with the first and second display device, ambient temperature (in Celsius or Fahrenheit) data from temperature sensors associated with the first and second display device, and color data from color sensors associated with the first and second display device. After determining that power is being received from an external power source or that the user prefers the display devices may be color matched, the computing device may perform one or more color adjustments based on the ambient light data, the ambient temperature data, and the color data, thereby reducing a difference in at least one perceived color between the first display device and the second display device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
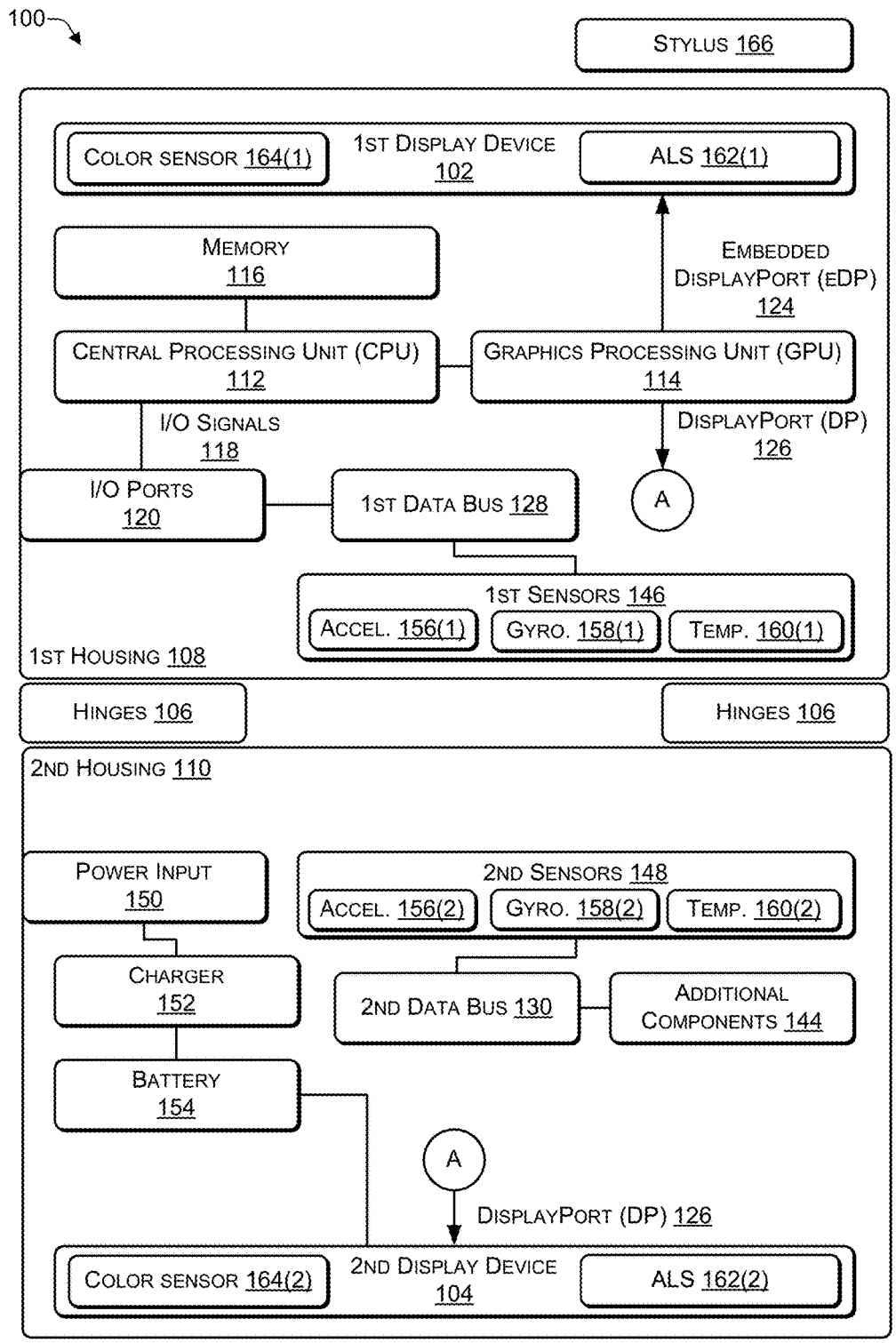
FIG. 1 is a block diagram of an architecture of a computing device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

An operating system may configure multiple display devices to behave as a single display device. For example, content (e.g., an application, a movie, or the like) may be displayed across the multiple display devices. When a portable computing device, such as a phone or tablet, includes multiple (two or more) display devices, the content being displayed across the multiple display devices may appear disjointed if the perceived colors displayed by one display device differ from the perceived colors displayed by another of the display devices. For example, a first display device may receive direct light while a second display device may receive indirect light, causing a difference in the perceived colors displayed by the two display devices. As another example, the first display device may receive light from a first light source and the second display device may receive light from a second light source. To illustrate, when a user is sitting near a window inside a building (e.g., home or workplace), the first light source may be the lighting used in the building (e.g., incandescent, fluorescent, or another type of lighting) while the second light source may be sunlight filtered through the window. The two different light sources may cause the user to perceive color variations, particular when content is being displayed across both display devices and one display device receives light primarily from the first light source while the other display device receives light primarily from the second light source.

In a portable computing device that includes multiple display devices, the various components (e.g., motherboard, memory, storage drive, battery, and the like) may be distributed among multiple housings, with each housing including one of the multiple display devices. For example, in a dual-display computing device, a first housing may be attached to a second housing by one or more hinges (or other mechanical coupling) that enable the first housing to be placed at an angle of between about 0 degrees to about 360 degrees relative to the second housing. In such a configuration, the motherboard, memory, and storage drive may be located in the first housing (behind the first display device) and the battery may be located in the second housing (behind the second display device). Some of these components may generate more heat than others, causing one housing to have a higher internal temperature (e.g., ambient temperature expressed in Celsius or Fahrenheit) than the other housing. The difference in heat may cause one display device to display colors that are appear to a user to be different than the other display device.

The systems and techniques described herein may use sensors, such as, for example, ambient light sensors (ALS), thermal (e.g., temperature) sensors, and color sensors, to determine the amount of ambient light falling on each display device, the ambient temperature of each display device, and the perceived color. Based on this information, the computing device may determine modifications to settings (e.g., gamma, chroma, luma, and the like) of one or both of the display devices to reduce (or eliminate) perceived differences in colors between the two display devices. In some cases, multiple lookup tables (e.g., gamma lookup tables) may be used to determine a gamma value to apply to a first display device to reduce (or eliminate) a perceived color difference between the first display and a second display device. The multiple lookup tables may be pre-calculated or calculated while waiting for the computing device to stop moving. By pre-computing gamma values and creating multiple tables, much less computational power may be used by performing a table lookup for a gamma value during run time instead of performing complex mathematical computations during run time.

As a first example, a computing device may include a first display device coupled to a second display device by one or more hinges (or other mechanical coupling) that enable the first display device to be placed at an angle between about 0 degrees to about 360 degrees relative to the second display device. A software program executing on the computing device may receive sensor data from multiple sensors (e.g., accelerometer, magnetometer/magnetic compass, gyroscope, and the like) and determine that the computing device has moved from a first orientation to a second orientation. The software program may determine that an angle between the first display device and the second display device satisfies a predetermined threshold specified by either a manufacturer of the computing device or a user of the computing device. For example, if the angle between the first display device and the second display device satisfies the predetermined threshold, then perceived differences between colors displayed by each of the display devices may be sufficiently significant to adversely affect the user's experience, causing the software program to modify parameters of one or both of the display devices to reduce (or eliminate) the perceived differences. If the angle between the first display device and the second display device does not satisfy the predetermined threshold, then perceived differences between colors displayed by the display devices may be relatively insignificant and color adjustments to one or both display devices may not be performed. The software program may receive first ambient light data from a first set of ambient light sensors associated with the first display device, receive second ambient light data from a second set of ambient light sensors associated with the second display device, receive first temperature data (e.g., ambient temperature) from a first set of temperature sensors associated with the first display device, receive second temperature data (e.g., ambient temperature) from a second set of temperature sensors associated with the second display device, receive first color data from a first set of color sensors associated with the first display device, and receive second color data from a second set of color sensors associated with the second display device. The first color data includes a first intensity value, a first chroma value, and a first hue value associated with the first display device; and the second color data includes a second intensity value, a second chroma value, and a second hue value associated with the second display device. The software program may determine that either power is being received from an external power source or that the user has specified a preference that the perceived color differences between the first display device and second display device are to be reduced, even if the computing device is being powered by a battery and reducing the color differences reduces battery life (e.g., reduces the amount of time the computing device can operate without the battery being recharged). The software program may determine one or more color adjustments based at least in part on the first ambient light data, the second ambient light data, the first temperature data, the second temperature data, the first color data, and the second color data. The software program may perform the one or more color adjustments to at least one of the first display device or the second display device, thereby reducing a difference in perceived colors between the first display device and the second display device. The software program may determine that the computing device has moved from the second orientation to a third orientation, determine that an angle between the first display device and the second display device does not satisfy the predetermined threshold, and perform no additional color adjustments to the first display device and to the second display device. The software program may determine that the computing device has moved from the third orientation to a fourth orientation, and determine that the computing device is receiving power from a battery. If a setting of the computing device indicates to prolong battery life (e.g., without another charge) the software program may not perform any additional color adjustments to the first display device and to the second display device. If a setting of the computing device indicates to reduce (or eliminate) a perceived color differences between the first display device and the second display device (e.g., even if reducing the perceived color differences increases power consumption and reduces battery life), the software program may perform additional color adjustments to at least one of the first display device or the second display device. The color adjustments may reduce (or eliminate) the perceived color differences between the first display device and the second display device.

As a second example, a computing device may include a first display device, a second display device, and one or more hinges (or other mechanical coupling mechanism) coupling the first display device to the second display device. The one or more hinges may enable the first display device to be placed at an angle between about 0 degrees to about 360 degrees relative to the second display device. A first set of (one or more) ambient light sensors, a first set of (one or more) temperature sensors that measure ambient temperature, and a first set of (one or more) color sensors may provide data associated with the first display device. A second set of (one or more) ambient light sensors, a second set of (one or more) ambient temperature sensors, and a second set of (one or more) color sensors may provide data associated with the second display device. The computing device may include one or more processors and one or more non-transitory computer readable media storing instructions executable by the one or more processors to perform various operations. The operations may include receiving sensor data from one or more sensors (e.g., accelerometer, magnetometer/magnetic compass, gyroscope, and the like) and determining (e.g., based on the sensor data) that the computing device has been moved from a first orientation to a second orientation. The operations may include receiving first ambient light data from the first set of ambient light sensors, receiving second ambient light data from the second set of ambient light sensors, receiving first temperature data from the first set of ambient temperature sensors, receiving second temperature data from the second set of ambient temperature sensors; receiving first color data from the first set of color sensors, and receiving second color data from the second set of color sensors. The operations may include determining that either power is being received from an external power source or that the user has specified a preference that the perceived color differences between the first display device and second display device are to be reduced, even if the computing device is being powered by a battery and reducing the color differences may reduce battery life (e.g., reduce the amount of time the computing device can operate without the battery being recharged). The operations may include determining one or more color adjustments based at least in part on: the first ambient light data, the second ambient light data, the first temperature data, the second temperature data, the first color data, and the second color data. The operations include performing the one or more color adjustments to at least one of the first display device or the second display device, thereby reducing a difference in perceived colors between the first display device and the second display device. The one or more color adjustments may include adjusting a parameter, such as, for example, a chroma parameter, a gamma parameter, or a luma parameter of the first display device, the second display device, or both. In some cases, performing the one or more color adjustments may include retrieving a gamma value from a gamma lookup table and applying the gamma value to either the first display device or the second display device. The operations may include determining that an angle between the first display device and the second display device satisfies a predetermined threshold specified by either a manufacturer (or a user) of the computing device. For example, if the angle between the first display device and the second display device satisfies the predetermined threshold, then perceived differences between colors displayed by each of the display devices may be sufficiently significant to adversely affect the user's experience, resulting in the software program modifying parameters of one or both of the display devices to reduce (or eliminate) the perceived differences. If the angle between the first display device and the second display device does not satisfy the predetermined threshold, then perceived differences between colors displayed by the display devices may be perceived as relatively insignificant and color adjustments to the display devices may not be performed. The operations may include determining that the computing device has moved from the second orientation to a third orientation, determining that an angle between the first display device and the second display device does not satisfy the predetermined threshold, and performing no additional color adjustments to the first display device and to the second display device. The operations may also include determining that the computing device has moved from the third orientation to a fourth orientation, determining that the computing device is receiving power from a battery, and reducing a perceived color difference between the first display device and the second display device based on performing an additional color adjustment to at least one of the first display device or the second display device.

As a third example, a computing device may include a first display device coupled to a second display device by one or more hinges (or other mechanical coupling mechanism) that enable the first display device to be placed at an angle between about 0 degrees to about 360 degrees relative to the second display device. A memory storage device of the computing device may be used to store instructions that are executable by one or more processors to perform various operations. The operations may include receiving sensor data from one or more sensors (e.g., accelerometer, magnetometer/magnetic compass, gyroscope, and the like) of the computing device and determining that the computing device has been moved from a first orientation to a second orientation. The operations may include receiving first ambient light data from a first set of ambient light sensors, receiving first temperature data from a first set of ambient temperature sensors, and receiving first color data from a first set of color sensors associated with a first display device. The operations may also include receiving second ambient light data from a second set of ambient light sensors, receiving second temperature data from a second set of ambient temperature sensors, and receiving second color data from a second set of color sensors associated with a second display device. The operations may include determining that either (1) power is being received from an external power source or (2) the user has specified a preference that the perceived color differences between the first display device and second display device are to be reduced, even if the computing device is being powered by a battery and reducing the color differences may reduce battery life (e.g., reduce the amount of time the computing device can operate without the battery being recharged). The operations may include determining one or more color adjustments based at least in part on: the first ambient light data, the second ambient light data, the first temperature data, the second temperature data, the first color data, and the second color data. The operations may include performing the one or more color adjustments to at least one of the first display device or the second display device, thereby reducing a difference in perceived colors between the first display device and the second display device based on the one or more color adjustments. For example, the one or more color adjustments may be performed by retrieving a gamma value from a gamma lookup table and applying the gamma value to either of the first display device or the second display device. By pre-calculating gamma values to create one or more gamma lookup tables, the run-time computational resource usage may be reduced from evaluating complex equations to a simple table lookup. The operations may further include determining that an angle between the first display device and the second display device satisfies a predetermined threshold specified by either a manufacturer of the computing device or a user of the computing device. For example, if the angle between the first display device and the second display device satisfies the predetermined threshold, then the perceived differences between colors displayed by each of the display devices may be sufficiently significant to adversely affect the user's experience, causing the software program to modify parameters of one or both of the display devices to reduce (or eliminate) the perceived differences. If the angle between the first display device and the second display device does not satisfy the predetermined threshold, then perceived differences between colors displayed by the display devices may be perceived as relatively insignificant and color adjustments to the display devices may not be performed. The operations may include determining that an angle between the first display device and the second display device satisfies the predetermined threshold before performing the one or more color adjustments. The operations may include determining that the computing device has moved from the second orientation to a third orientation, determining that an angle between the first display device and the second display device does not satisfy the predetermined threshold, and performing no additional color adjustments to the first display device and to the second display device. In some cases, the operations may include determining that the computing device is receiving power from a battery, determining that a setting (e.g., set by a manufacturer or a user) of the computing device indicates to prolong a life of the battery, and performing one or more additional color adjustments to the first display device or to the second display device. In other cases, the operations may include determining that a setting of the computing device indicates to reduce (or eliminate) a perceived color difference between the first display device and the second display device (e.g., without regard to the power source), and performing additional color adjustments to at least one of the first display device or the second display device, thereby reducing the perceived color differences between the first display device and the second display device.

FIG. 1 is a block diagram of an architecture of a computing device according to some embodiments. In some implementations, the computing device 100 may include two (or more) housings while in other implementations the computing device 100 may include a single housing (e.g., a tablet form factor). As illustrated in FIG. 1, the computing device 100 may include a first housing 108 coupled to a second housing 110 via one or more hinges 106 (or other mechanical coupling mechanism). The hinges 106 may enable the two housings 108, 110 to be positioned at different angles relative to each other in different orientations (e.g., various vertical orientations and various horizontal orientations). Of course, additional housings may be attached via additional hinges (or other mechanical coupling mechanism) to create a computing device with multiple housings.

A first display device 102 may be located in the first housing 108 and, in some cases, a second display device 104 may be located in the second housing 110. A first portion of the components of the computing device 100 may be located in the first housing 108 (e.g., behind the first display device 102) while a remaining portion of the components of the computing device 100 may be located in the second housing 110 (e.g., behind the second display device 104). For example, as illustrated in FIG. 1, the components located in the first housing 108 may include at least one central processing unit (CPU) 112, a graphics process unit (GPU) 114, and a memory (e.g., computer-readable media) 116. The GPU 114 may be integrated into the CPU 112 or may be a separate device from the GPU 114. The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 108 and two or more lanes of DisplayPort (DP) output 126 that are sent (e.g., wirelessly or via a cable) to the second display device 110 in the second housing 110.

A first data bus 128 in the first housing 108 and a second data bus 130 in the second housing 110 may distribute data among the various components of the computing device 100. For example, the data buses 128, 130 may distribute data from the I/O signals 118, the I/O ports 120, a first set of sensors 146, a second set of sensors 148, and additional components 144. For example, the data buses 128, 130 may distribute data by receiving data from a component of the computing device 100 and transmitting the data to one or more of the other components of the computing device 100.

The second housing 110 may include a remaining portion of the components of the computing device 100. In some cases, the components in the second housing 110 may be located behind the second display device 104. The second housing 110 may include the additional components 144 (e.g., keyboard, touchpad, trackball, speaker, microphone, Wi-Fi antenna, Bluetooth antenna, Zigbee Antenna, cellular antenna, and the like), the second set of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 108 with the components of the computing device 100 located in the second housing 110. In other cases, a first wireless transceiver in the first housing 108 and a second wireless transceiver in the second housing 110 may provide wireless communications between (1) the components of the computing device 100 located in the first housing 108 and (2) the components of the computing device 100 located in the second housing 110. The first set of sensors 146 may include one or more of an accelerometer 156(1), a gyroscope 158(1), an electronic compass (e-compass), a barometer, a magnetometer, a proximity sensor, a ambient temperature sensor 160(1) (e.g., to measure a ambient temperature within a predetermined distance of the first display device 102), a camera (or another type of imaging sensor), a fingerprint sensor, a global positioning satellite (GPS) sensor, a sensor to detect movement of (e.g., detect a change in an angle between) the hinges 106, a proximity sensor, another type of sensor, or any combination thereof. The second set of sensors 148 may include one or more of an accelerometer 156(2), a gyroscope 158(2), an electronic compass (e-compass), a barometer, a magnetometer, a proximity sensor, a temperature sensor 160(2) (e.g., to measure a ambient temperature within a predetermined distance of the second display device 104), a camera (or another type of imaging sensor), a fingerprint sensor, a global positioning satellite (GPS) sensor, a sensor to detect movement of (e.g., detect a change in an angle between) the hinges 106, a proximity sensor another type of sensor, or any combination thereof.

The first housing 108 may include at least one ambient light sensor (ALS) 162(1) that is capable of measuring an amount of ambient light being received by a surface of the first display device 102. The first housing 108 may include one or more color sensors 164(1). The second housing 110 may include at least one ALS 162(2) that is capable of measuring an amount of ambient light being received by a surface of the second display device 104. The second housing 110 may include one or more color sensors 164(2). The color sensors 164 may measure an intensity of light, chroma, and hue associated with each of the display devices 102, 104.

In FIG. 1, the first set of components of the computing device 100 shown as being located in the first housing 108 and the remaining set of components shown as located in the second housing 110 are purely for illustration purposes. Depending on the implementation, different components of the computing device 100 may be housed in one or both of the housings 108, 110. For example, when the computing device 100 is designed for graphics processing, the GPU 114 and supporting hardware (e.g., graphics support chips, graphics memory, and the like) may be housed in the second housing 110. As another example, in some cases, the ports 120 may be located in the first housing 108, in the second housing 110, or split between the two housings 108, 110. As a further example, the battery 154 may include multiple power cells, with a portion of the power cells located in the first housing 108 and zero or more of the power cells located in the second housing 110. In some cases, which components of the computing device 100 are located in each of the housings 108, 110 may be determined by the thermal characteristics of the components. For example, the components may be distributed between the housings 108, 110 to enable each of the housings 108, 110 to heat to approximately the same ambient temperature. Doing so may avoid grouping components that generate the most heat into the same housing, thereby causing one housing to be hotter than the other housing. The temperature sensors 160 may be used to determine a current ambient temperature (e.g., in Celsius or Fahrenheit) within each of the housings 108, 110, a current ambient temperature close to each of the display devices 102, 104, or both. The colors displayed by the display devices 102, 104 may change based on temperature.

The display devices 102, 104 may be configured to behave as independent display devices or the display device 104 may be configured as an extension of the display device 102 to enable both display devices to function as a single larger sized display device. The operating system of the computing device 100 may enable the user to "lock" a particular orientation (e.g., rotation) of the content being displayed on each display device to avoid the computing device 100 repeatedly re-orientating (e.g., rotating) the content as the user moves (e.g., re-positions) the computing device 100.

Software instructions implementing an operating system and one or more applications, including at least one application to reduce (or eliminate) perceived color differences between the display devices 102, 104, may be stored in the memory 116. The software instructions may be executed by the CPU 112, by the DSP processor 122, or any combination thereof.

Thus, a computing device may include a first housing coupled to a second housing by one or more hinges (or other mechanical coupling mechanism). The computing device 100 may include software that enables a user to use the computing device 100 with a stylus in a manner similar to a pad of paper (or paper-based notebook) and ink-based pen (or graphite-based pencil). Various sensors, such as, for example, gyroscopes, electronic compasses (e.g., magnetometers), accelerometers, and the like, may be used to determine the screen orientation for the computing device 100. In particular, ambient light sensors, color sensors, and temperature sensors may be used to determine an amount of ambient light, a perceived color, and an ambient temperature, respectively, of each of the display devices 102, 104. When conserving battery life is not important, the display device with the duller, more washed out colors may be brightened to match the display device with the brighter, more vivid colors. When conserving battery life is important, the brightens of the display device with the brighter, more vivid colors may be reduced to match the display device with the duller, more washed out colors.

Based on sensor data received from the light sensors, color sensors, and ambient temperature sensors, the computing device 100 may adjust color parameters of one or both of the display devices 102, 104 to reduce (or eliminate) perceived color differences between the display devices 102, 104. The color parameters that are adjusted for each of the display devices 102, 104 may include at least one of chroma, gamma, or luma. In some cases, one or more of the chroma values, gamma values, and luma values may be pre-calculated and used to create lookup tables for chroma, gamma, and luma. See Tables 1 and 2 below as examples of a gamma table. Similar lookup tables may be created for chroma and luma. Because the complex calculations were previously performed to create the values in the lookup table, retrieving values from a lookup table does not require significant a significant amount of processing power and may be performed by a CPU that is not capable of performing floating point computations and the like. Thus, the CPU 112 may not have a relatively fast clock speed and may be energy efficient.

Reducing color differences between the display devices 102, 104 may maintain readability of content, including video, text, and graphics. For example, the display device 102 may appear washed out (e.g., due to direct light) and may be brightened, but it may not be desirable to have the display device 102 too bright. For example, making the display device 102 too bright may increase power consumption significantly, increase heat generation by the circuitry of the display device 102 significantly, cause the display device 102 to appear harsh, shorten the lifespan of the display device 102, or any combination thereof. In such situations, the brightness of the display device 102 may be increased and the brightness of the display device 104 may be decreased to reduce the differences between the display devices 102, 104.

Chroma (also known as chrominance) conveys the color information in images, separately from the accompanying luma (brightness) of the images. Chrominance may be represented as two color-difference components: U=B'-Y' (blue-luma) and V=R'-Y' (red-luma). Scale factors and offsets may be applied to each difference component, as specified by an applicable video standard. In video signals, the U and V signals may modulate a color subcarrier signal, resulting in a chrominance signal. The phase and amplitude of the modulated chrominance signal may correspond approximately to the hue and saturation of the color. In terms of digital video and digital images, the luma and chroma components may be digital values.

Luma is the weighted sum of gamma-compressed R'G'B' components of video data. The prime symbol ' denotes gamma compression. Relative luminance may be expressed as weighted sum of linear RGB components. Luma (e.g., relative luminance) may refer to the brightness of a display device. The formula used to calculate relative luminance may uses coefficient based on the CIE color matching functions and the relevant standard chromaticities of red, green, and blue. CIE 1931 is a Color Matching System that specifies how to numerically specify a measured color, and accurately reproduce that measured color (e.g. in print or on a digital display device). The Color Matching System indicates which combinations of light appear to a user to be the same color ("match"). Luma (e.g., gamma-corrected luminance) describes the exposure (brightness) of an image or a series of images (e.g., video). Luma may be separated from the color of an image or a series of images (e.g., video). Luma may be measured per color as a digital percentage from 0 to 100, where 0 represents absolute black and 100 represents absolute white.

Gamma refers to the nonlinear representation of luminance in an image or series of images displayed on a display device. Gamma is also used to describe a nonlinear adjustment made to the distribution of midtones in an image. For example, a gamma adjustment may not alter the black point and the white point of an image, but may brighten or darken the mid-tones, based on the type of adjustment being made. Chroma (also referred to as chrominance) describes the color channels in images, ranging from the absence of color to the maximum levels of color that can be represented. Specific chroma values can be described using two properties, hue and saturation.

Figure 2:
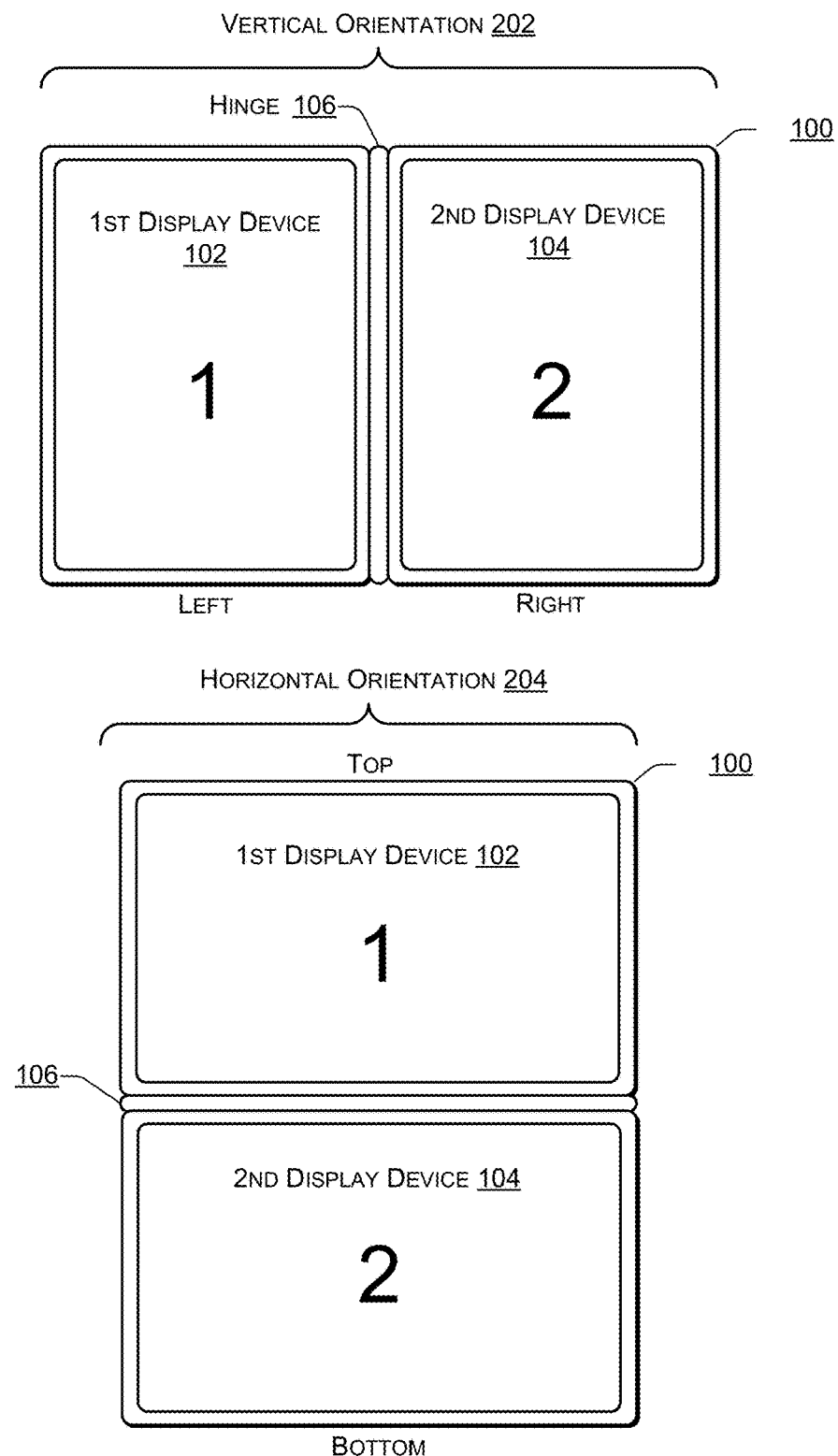
FIG. 2 is a block diagram illustrating different orientations of a dual-display device according to some embodiments.
Figure 3:
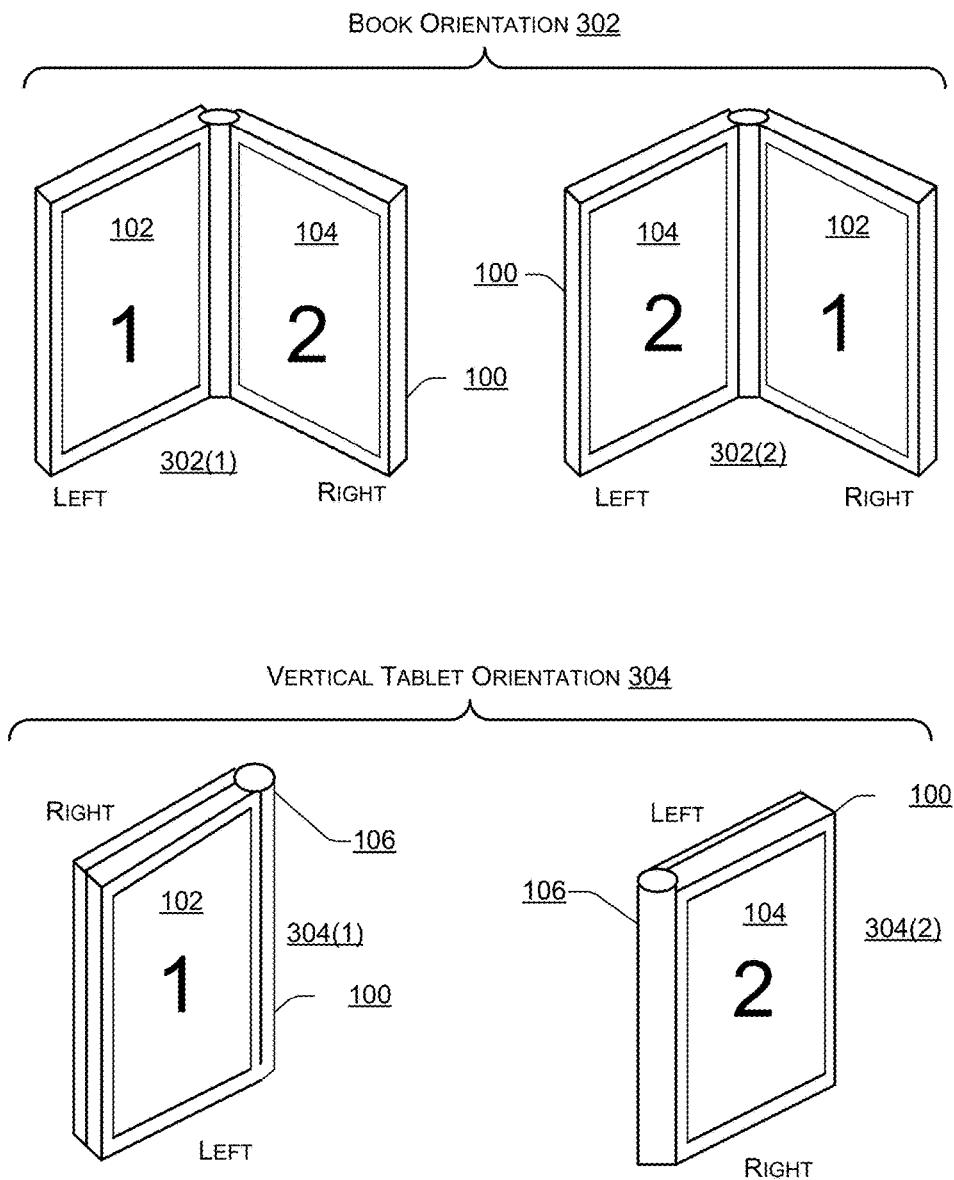
FIG. 3 is a block diagram illustrating modes of a dual-display device in a vertical orientation according to some embodiments.

FIG. 2 is a block diagram 200 illustrating different orientations of a dual-display device (e.g., the computing device 100 of FIG. 1) according to some embodiments. The computing device 100 may include at least two display devices 102, 104. The computing device 100 may be displayed in a vertical (e.g., portrait) orientation 202 or a horizontal (e.g., landscape) orientation 204. For example, in the vertical orientation 202, the first display device 102 may be on one side (e.g., the left side or the right side), the second display device 104 may be on another side (e.g., the right side or the left side), and the hinge 106 may join the first display device 102 to the second display device 104. Additional examples of the vertical orientation 202 are illustrated in FIG. 3. In the horizontal orientation 204, the first display device 102 may be located at the top (or the bottom) of the computing device 100 with the hinge 106 in the middle and the second display device 104 may be located at the bottom (or the top) of the computing device 100. Additional examples of the horizontal orientation 204 are illustrated in FIG. 4.

FIG. 3 is a block diagram 300 illustrating additional vertical orientations of a dual-display device according to some embodiments. Additional examples of the vertical orientation 202 may include a book orientation 302 and a vertical tablet orientation 304. For example, in a first book orientation 302(1), the first display device 102 may be on the left and the second display device 104 may be on the right. Alternately, in a second book orientation 302(2), the second display device 104 may be on the left and the first display device 102 may be on the right.

In the vertical tablet orientation 304, the first display device 102 may be on the left and the second display device 104 may be on the right. In a first vertical tablet orientation 304(1), the first display device 102 may be facing a user and the second display device 104 may be rotated approximately 360 degrees to face away from the user. In a second vertical tablet orientation 304(2), the second display device 104 may be facing the user while the first display device 102 may rotated approximately 360 degrees to face away from the user.

Figure 4:
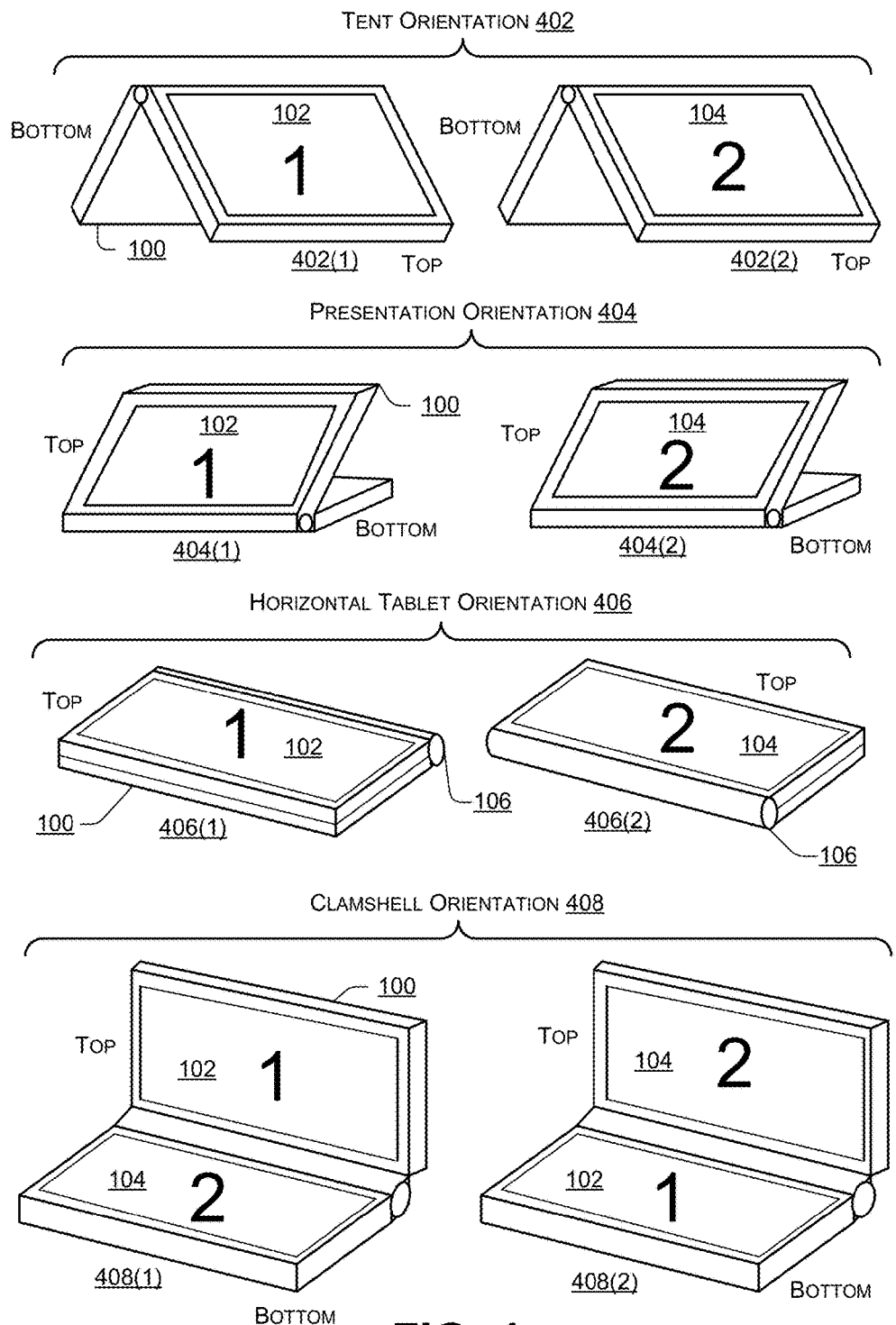
FIG. 4 is a block diagram illustrating modes of a dual-display device in a horizontal orientation according to some embodiments.

FIG. 4 is a block diagram 400 illustrating additional horizontal orientations of a dual-display device according to some embodiments. Additional examples of the horizontal orientation 204 may include a tent orientation 402, a presentation orientation 404, a horizontal tablet orientation 406, and a clamshell orientation 408.

In 402(1), the first display device 102 may be at the top facing the user while the second display device 104 may be at the bottom facing away from the user. In 402(2), the second display device 104 may be at the top facing the user and the first display device 102 may be at the bottom facing away from the user.

In 404(1), the first display device 102 may be at the top facing the user and the second display device 104 may be at the bottom facing down. In 404(2) the second display device 104 may be at the top facing the user and the first display device 102 may be at the bottom facing down.

In 406(1), the first display device 102 may be at the top facing the user and the second display device 104 may be at the bottom facing down (e.g., away from the user). In 406(2), the second display device 104 may be at the top facing the user and the first display device 102 may be at the bottom facing down (e.g., away from the user).

In 408(1), the first display device 102 may be at the top facing the user and the second display device 104 may be at the bottom facing the user (e.g., in a position where traditionally, a keyboard is located in a laptop). In 408(1), in some cases, a QWERTY-based keyboard may be displayed on the second display device 104 and used to receive keyboard input. In 408(2), the second display device 104 may be at the top facing the user and the first display device 102 may be at the bottom facing the user (e.g., in a position where traditionally, a keyboard is located in a laptop). In 408(2), in some cases, a QWERTY-based keyboard may be displayed on the first display device 102 and used to receive keyboard input.

Figure 5:
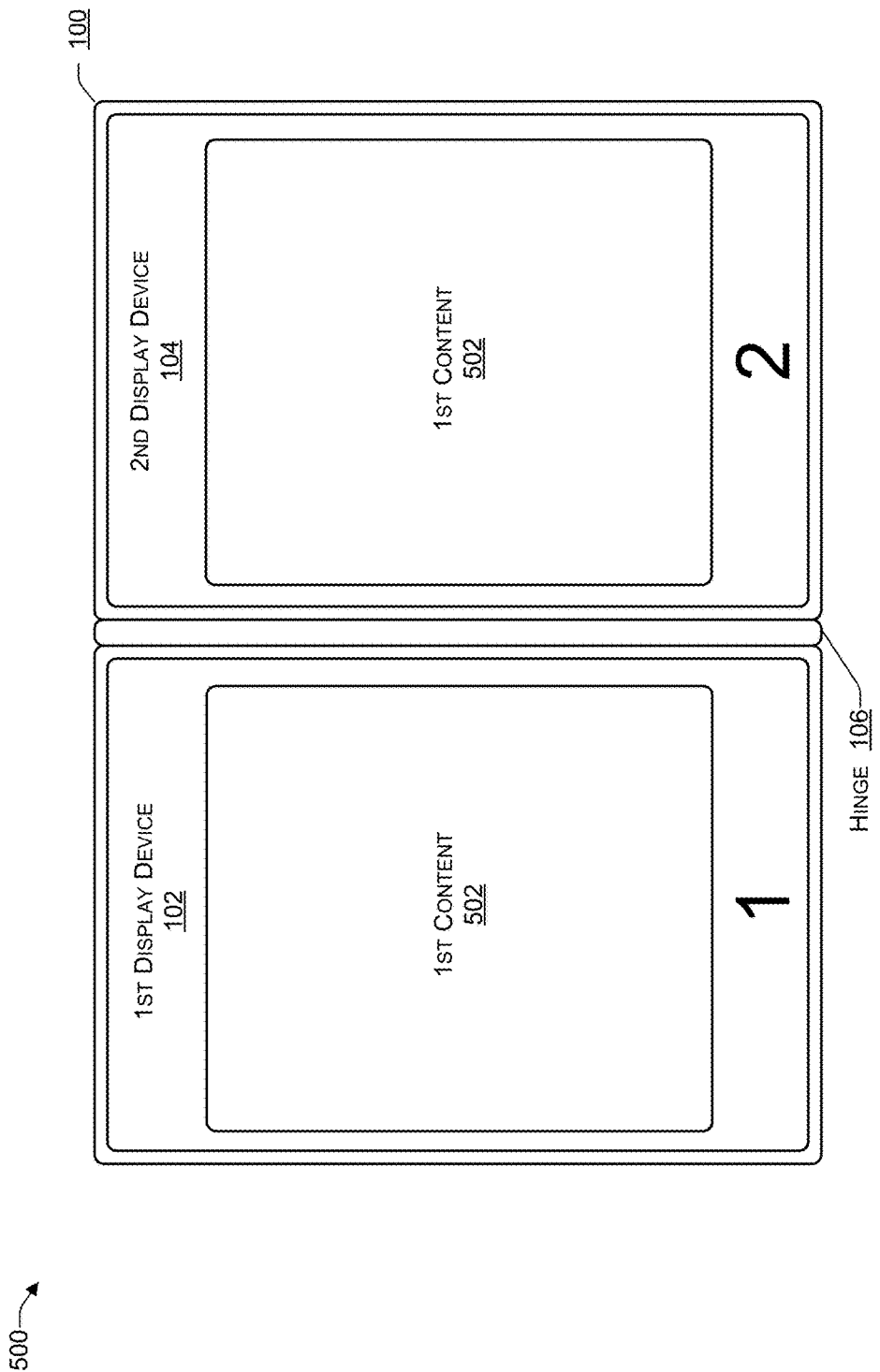
FIG. 5 is a block diagram illustrating a dual-display device in which the operating system is in a clone mode according to some embodiments.

FIG. 5 is a block diagram 500 illustrating a dual-display device in which the operating system is in a clone mode according to some embodiments. An operating system of the computing device 102, such as Microsoft® Windows®, may provide three display modes: (a) an extended desktop mode in which the display devices 110, 112 behave as if they were a single display device, with the display device 112 behaving as an extension of the display device 110 (b) a clone mode in which each of the display devices 110, 112 display the same content, or (c) a single display mode, e.g., one of the display devices 110, 112 displays content while the other display device is off (or blank) and does not display content. For example, single display mode may be used when the computing device is in a tablet orientation to turn off a particular display device (of the display devices 102, 104) that is not facing the user or is not visible to the user.

In the clone mode, first content 502 may be displayed on the first display device 102. The first content 502 may also be displayed on the second display device 104. Thus, in the clone mode, the same content 502 may be displayed on both display devices 102, 104.

Figure 6:
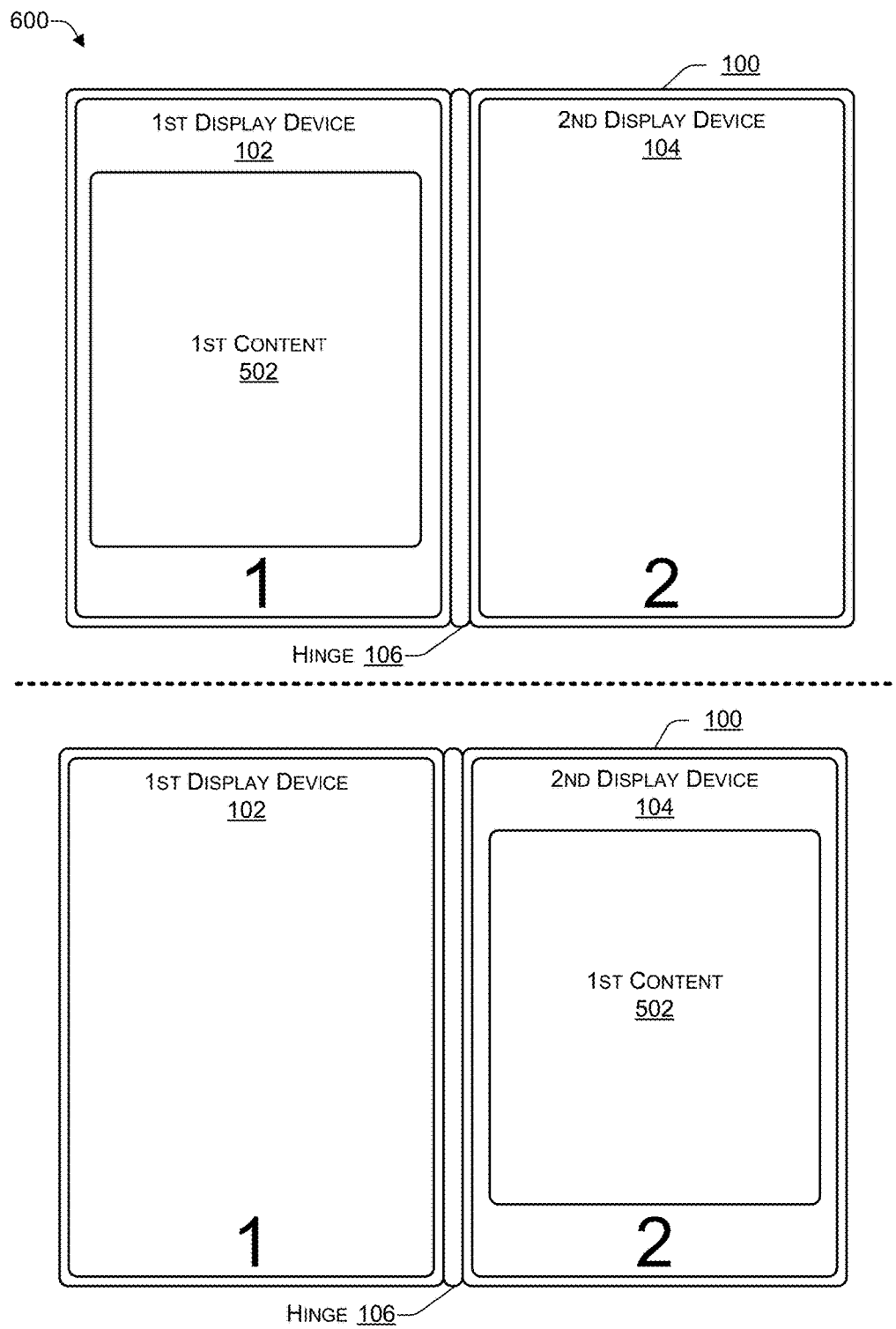
FIG. 6 is a block diagram illustrating a dual-display device in which the operating system is in a single display mode according to some embodiments.

FIG. 6 is a block diagram 600 illustrating a dual-display device in which the operating system is in a single display mode according to some embodiments. When an operating system of the computing device 102 of FIG. 1 is in the single display mode, the first content 502 may be displayed on either (but not both) of the first display device 102 or the second display device 104. For example, the first content 502 may be displayed on the first display device 102 and the second display device 104 may not display any content (e.g., the second display device 104 may be blank or off), as illustrated in the top of FIG. 6. As another example, the first content 502 may be displayed on the second display device 104 and the first display device 102 may not display any content (e.g., the first display device 102 may be blank or off), as illustrated in the bottom of FIG. 6.

The single display mode may be used when the computing device 100 is in one of the orientations 304 of FIG. 3 or 406, 402 of FIG. 4. In these orientations, the single display mode may reduce power consumption by turning off (or not displaying content on) whichever of the display devices 102, 104 is not facing the user. In addition, using the single display mode may prevent others in the surrounding area from viewing the content being displayed, thereby providing privacy and security when confidential information is being displayed.

Figure 7:
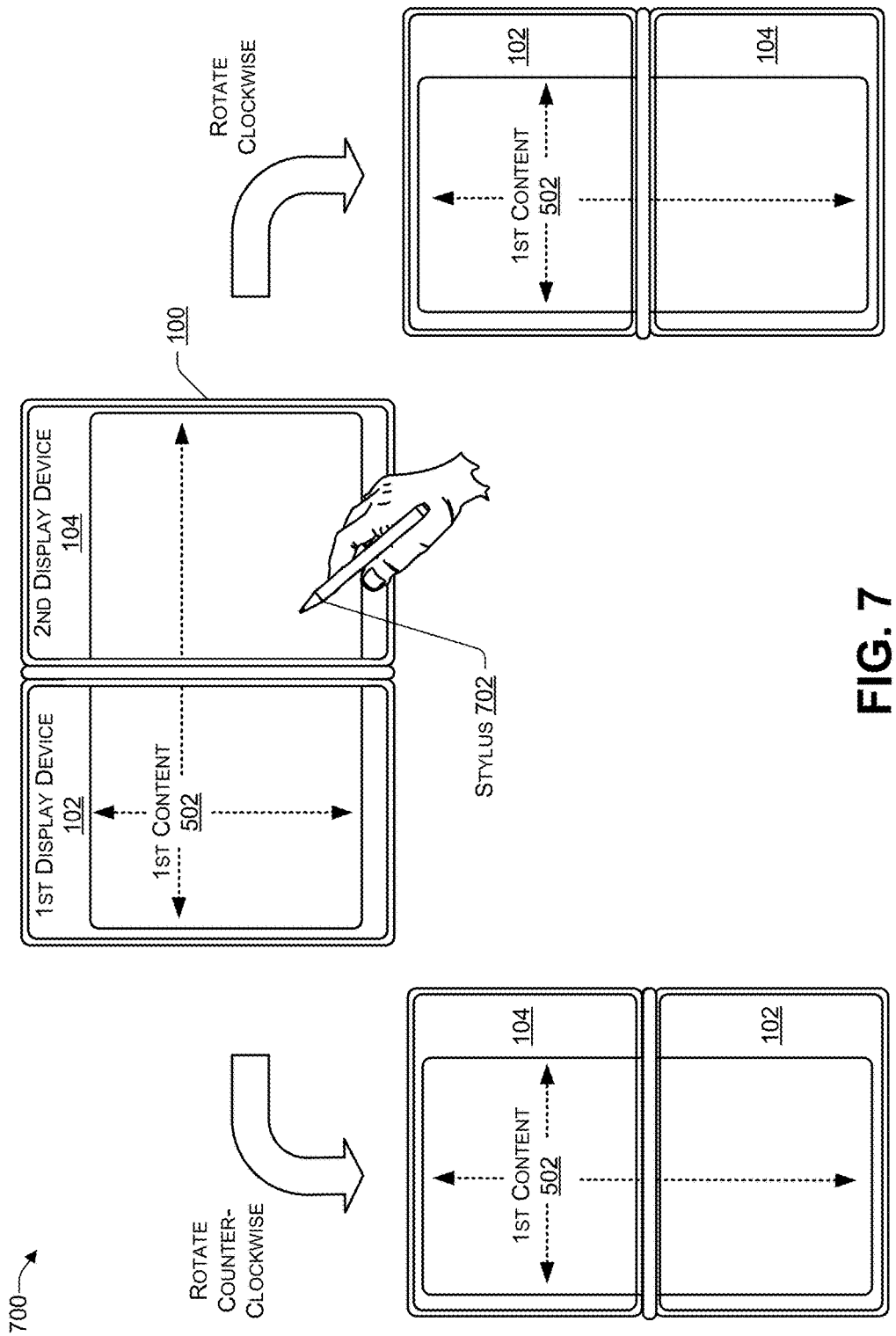
FIG. 7 is a block diagram illustrating a dual-display device in which the operating system is in an extended display mode displaying content that spans both display devices according to some embodiments.

FIG. 7 is a block diagram 700 illustrating a dual-display device in which the operating system is in an extended display mode with content spanning both display devices according to some embodiments. When the operating system of the computing device 102 of FIG. 1 is in the extended display mode, some content, such as the first content 502, may be displayed to span both the first display device 102 and the second display device 104. In some cases, additional content may be displayed on either or both of the first display device 102 or the second display device 104. The user may provide touch-input using a finger (or other appendage) or a touch-input device, such as a stylus 702.

When the user rotates the computing device 100 counter-clockwise, the computing device 100 may automatically re-position the first content 502, as illustrated in FIG. 7, by rotating the content 502 clockwise 90 degrees. When the user rotates the computing device 100 clockwise, the computing device 100 may automatically re-position the first content 502, as illustrated in FIG. 7, by rotating the content 502 clockwise 270 degrees. In this way, when the user re-positions (e.g., re-orients) the computing device 100, the content 502 may be rotated to display the first content 502 in a correct orientation relative to the user.

Figure 8:
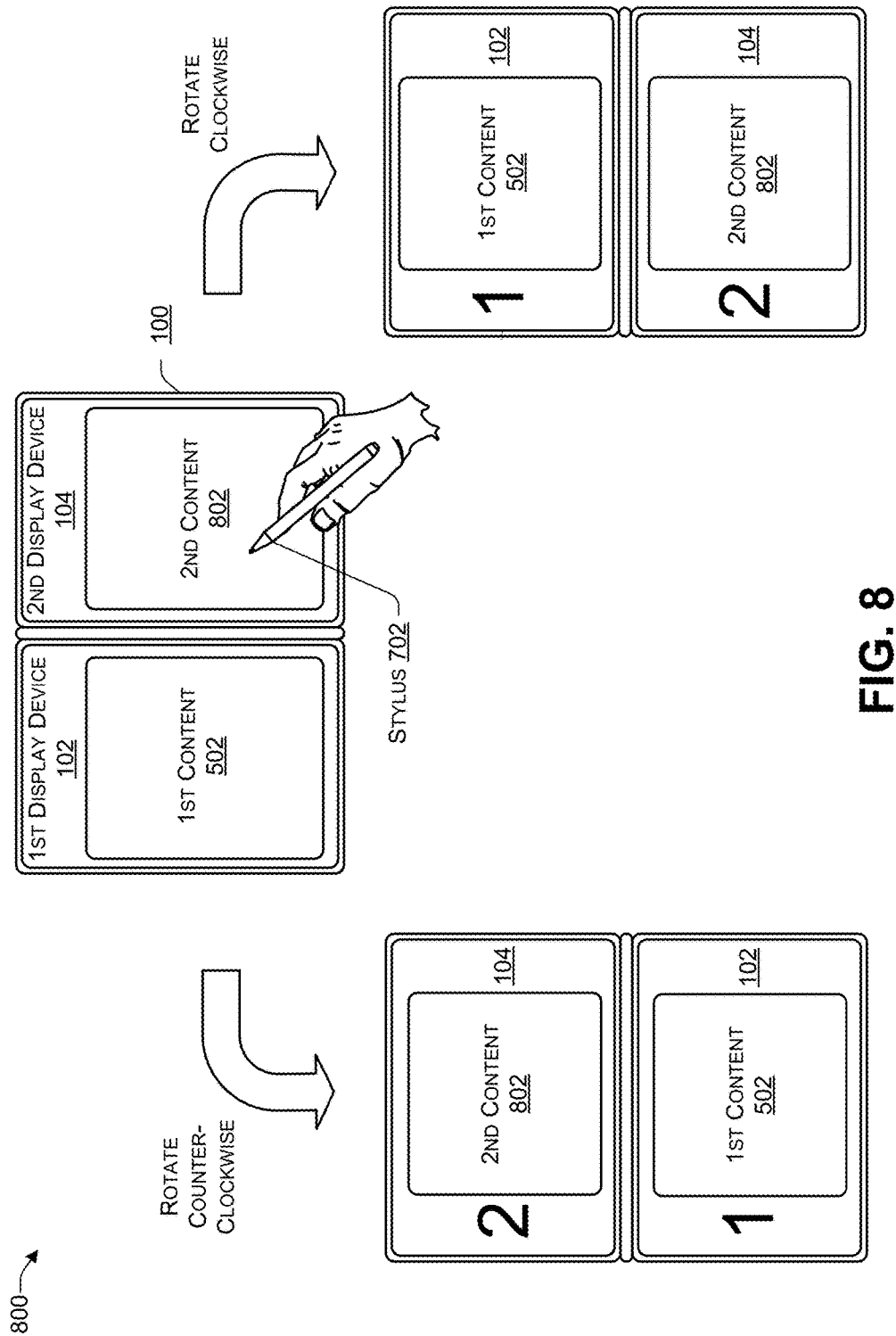
FIG. 8 is a block diagram illustrating a dual-display device in which the operating system is in an extended display mode displaying first content and second content according to some embodiments.

FIG. 8 is a block diagram 800 illustrating a dual-display device in which the operating system is in an extended display mode with first content and second content according to some embodiments. When the operating system of the computing device 102 of FIG. 1 is in the extended display mode, the first content 502 may be displayed on the first display device 102 and second content 802 may displayed on the second display device 104. In some cases, additional content may be displayed on either or both of the first display device 102 or the second display device 104. The user may provide touch-input using a finger (or other appendage) or a touch-input device, such as a stylus 702.

When the user rotates the computing device 100 counter-clockwise, the computing device 100 may automatically re-position the first content 502 and second content 802, as illustrated in FIG. 8, by rotating each of the content 502, 802 clockwise 90 degrees. When the user rotates the computing device 100 clockwise, the computing device 100 may automatically re-position the content 502, 802, as illustrated in FIG. 8, by rotating the content 502, 802 clockwise 270 degrees. In this way, when the user re-positions (e.g., re-orients) the computing device 100, the content 502, 802 may be rotated to a correct (e.g., viewable) orientation relative to the user.

Figure 9:
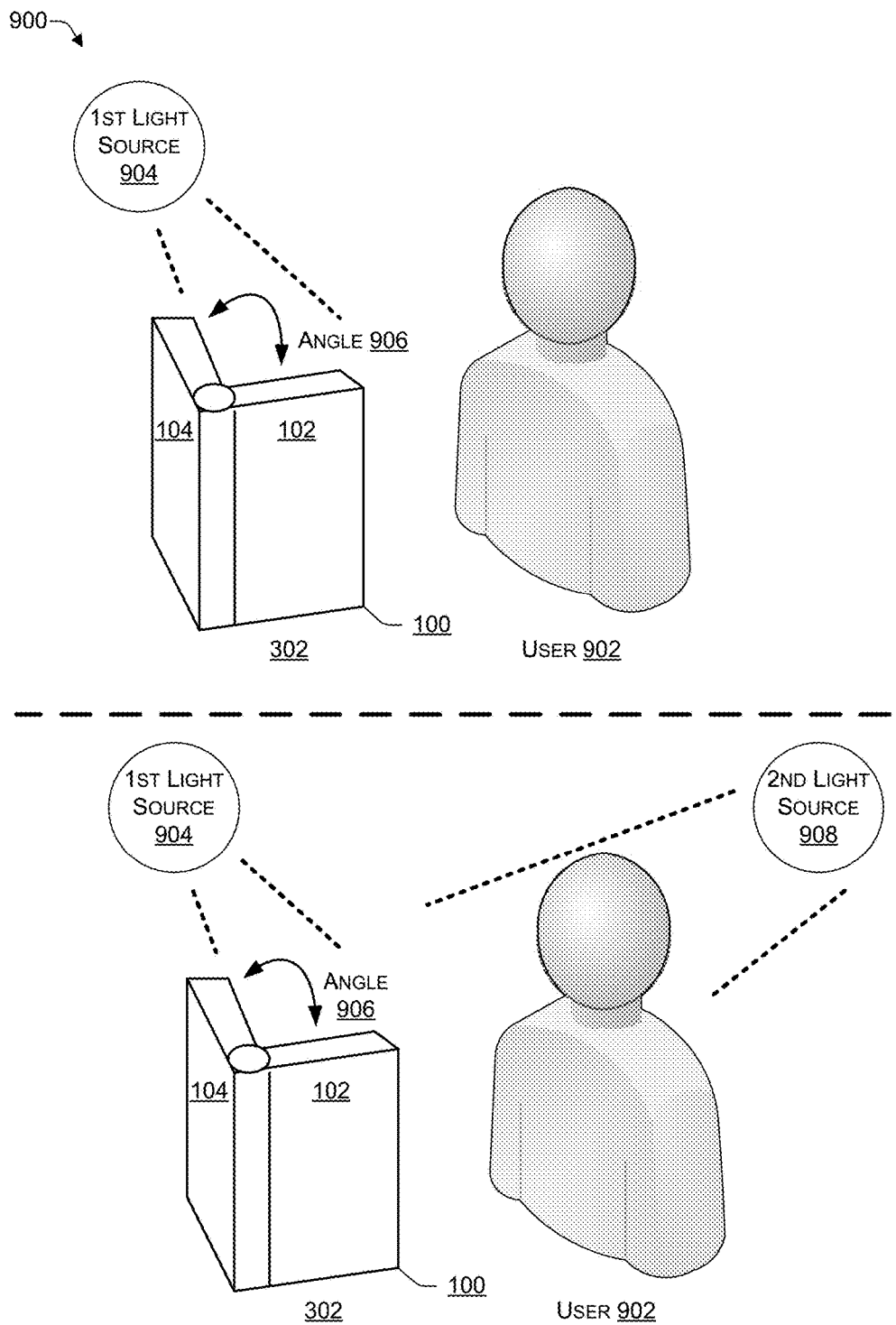
FIG. 9 is a block diagram illustrating how one or more light sources may affect a dual-display device according to some embodiments.

FIG. 9 is a block diagram 900 illustrating how one or more light sources may affect a dual-display device according to some embodiments. In the top half of FIG. 9, a user 902 may be using the computing device 100 in the book orientation 302. A first light source 904 may be positioned as shown in FIG. 9. The user may place the computing device 100 such that there is an angle 906 (e.g., of about 0 degrees to about 360 degrees) between the display devices 102 relative to the display device 104. The display device 102 may receive mostly (>80%) direct light from the first light source 904. The display device 104 may receive some direct light (<20%) but mostly indirect light (>80%) from the first light source 904. Because each of the display devices 102, 104 receive a different amount of direct light from the first light source 904, the user 902 may perceive a difference in colors between the two display devices 102, 104. For example, the colors displayed on the display device 104 may appear to the user 902 to be bright and saturated while the colors displayed on the display device 104 may appear to the user 902 to be washed out, due to the direct light. The computing device 100 may gather sensor data, including the ambient light associated with the display devices 102, 104, the colors being displayed by the display devices 102, 104, and the temperature in the vicinity of the display devices 102, 104. Based on the sensor data, the computing device 100 may modify one or more of the gamma, chroma, and luma levels for one or both of the display devices 102, 104 to reduce (or eliminate) the difference in the perceived colors (and color brightness) between the display devices 102, 104.

In the bottom half of FIG. 9, a user 902 may be using the computing device 100 in the book orientation 302. The user may place the computing device 100 such that there is the angle 906 (e.g., of about 0 degrees to about 360 degrees) between the display devices 102, 104. The first light source 904 and a second light source 908 may be positioned as shown in FIG. 9. The display device 102 may receive mostly (>80%) direct light from the first light source 904. The display device 102 may receive some (<20%) direct light but mostly (>80%) indirect light from the first light source 904. The display device 104 may receive mostly (>80%) direct light from the second light source 908. The display device 102 may receive some (<20%) direct light but mostly (>80%) indirect light from the second light source 908. Thus, each of the display devices 102, 104 may receive a different amount of direct light from each of the light sources 904, 908.

In addition, the light sources 904, 908 may each have different color temperatures. Color temperature describes the appearance of light from a light source and is measured in degrees of Kelvin (K) on a scale from 1,000 to 10,000. For example, commercial and residential lighting may have a color temperature between 2000K to 6500K. Color temperatures between 2000K to 3000K may be referred to as "warm white" and may range from orange to yellow-white in appearance. Color temperatures between 3100K and 4500K may be referred to as "cool white" or "bright white" and may emit a relatively neutral white light or white light with a slightly blue tint. Color temperatures above 4500K may be referred to as "daylight" color temperatures because the light is similar to daylight. For example, if the user 902 is sitting in a building near a window, one of the light sources 904, 906 may be cool white (e.g., the building's interior lighting) while another of the light sources may be daylight filtered through a window of the building.

The user 902 may perceive a difference in colors between the two display devices 102, 104 due to the amount of direct and indirect light and the color temperatures of the light sources 904, 908. For example, the colors displayed by the display device 104 may appear to the user 902 to be different than colors displayed by the display device 106 due to the different light sources 904, 908. The computing device 100 may gather sensor data, including the ambient light associated with the display devices 102, 104, the colors being displayed by the display devices 102, 104, and the ambient temperature in the vicinity of the display devices 102, 104. Based on the sensor data, the computing device 100 may modify one or more of the gamma, chroma, and luma levels for one or both of the display devices 102, 104 to reduce (or eliminate) the difference in the perceived colors (and color brightness) between the display devices 102, 104.

Figure 10:
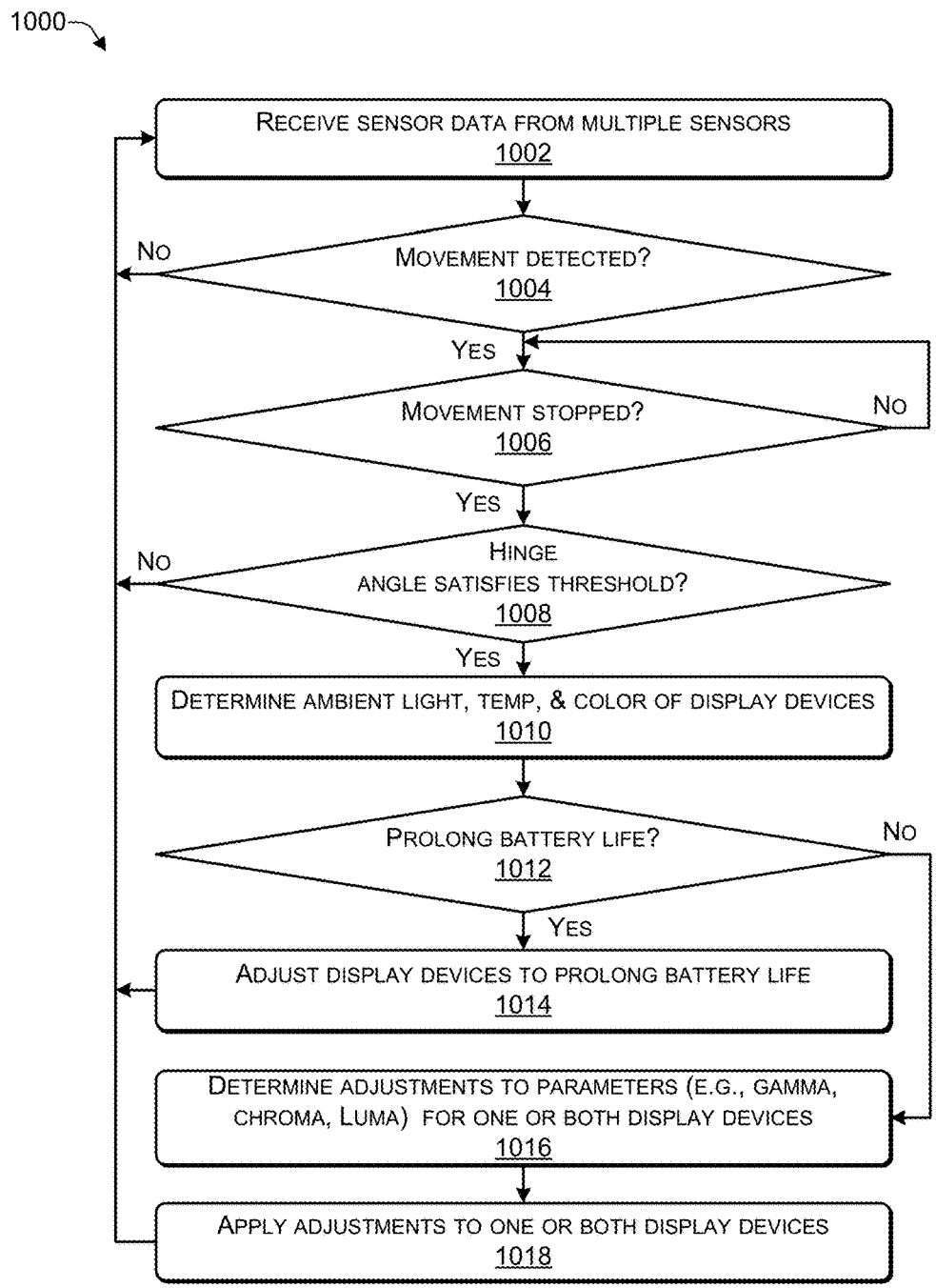
FIG. 10 is a flowchart of a process that includes applying gamma and chroma correction to at least one of multiple displays according to some embodiments.
Figure 11:
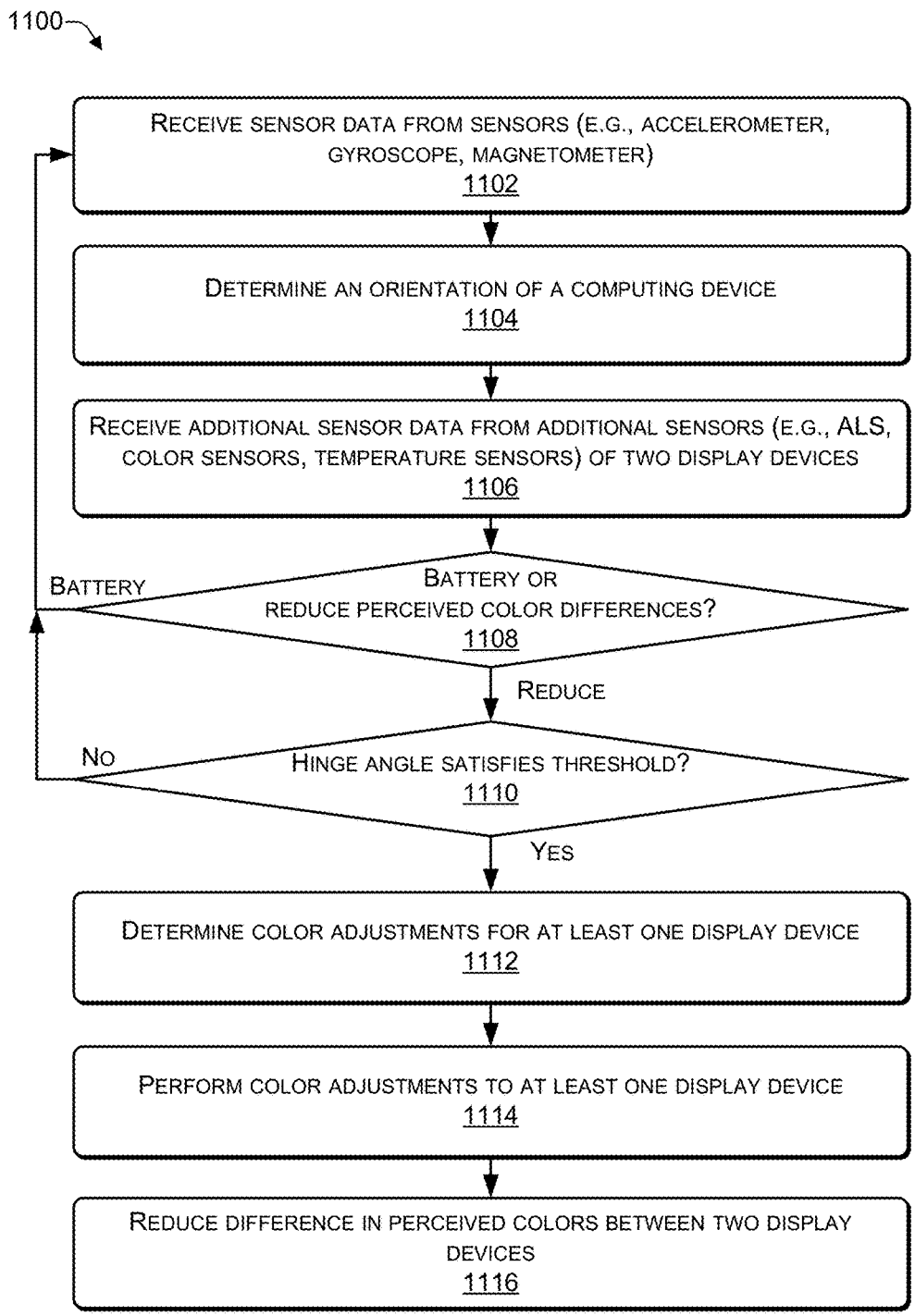
FIG. 11 is a flowchart of a process that includes determining an orientation of a computing device according to some embodiments.

In the flow diagrams of FIG. 10 and FIG. 11, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 1000 and 1100 are described with reference to FIGS. 1, 2, 3, 4, 5, 6, 7, 8, and 9 as described above, although other models, frameworks, systems and environments may be used to implement this process.

FIG. 10 is a flowchart of a process 1000 that includes detecting movement of a dual-display device according to some embodiments. The process 1000 may be performed by software instructions and/or firmware instructions stored in the memory 116 and executed by the CPU 112 of the computing device 100 of FIG. 1.

At 1002, sensor data may be received from multiple sensors. At 1004, a determination may be made (e.g., based on the sensor data) whether movement of the computing device is detected. In response to determining, at 1004, that no movement of the computing device is detected, the process may proceed to 1002, where additional sensor data may be received. In response to determining, at 1004, that movement of the computing device is detected, the process may proceed to 1006, where a determination may be made whether the computing device has stopped moving. In response to determining, at 1006, that "no" the computing device has not stopped moving, the process may remain at 1006, e.g., periodically determining whether the computing device has stopped moving. In response to determining, at 1006, that "yes" the computing device has stopped moving, the process may proceed to 1008. For example, in FIG. 1, the CPU 112 may receive sensor data from one or more of the sensors 146, 148, 162, 164. Based on the sensor data, the CPU 112 may determine whether the computing device 100 is being moved (e.g., from a current orientation to a new orientation). If the CPU 112 determines that the computing device 100 is being moved, the CPU 112 may monitor the sensor data to determine when the computing device 100 stops moving (e.g., the computing device 100 has been placed in the new orientation).

At 1008, a determination may be made whether a hinge angle (e.g., an angle of the first display device relative to the second display device) satisfies a predetermined threshold. If a determination is made, at 1008, that the hinge angle does not satisfy the predetermined threshold, then the process may proceed to 1002. If a determination is made, at 1008, that the hinge angle satisfies the predetermined threshold, then the process may proceed to 1010. For example, in FIG. 9, the user (or the manufacturer of the computing device) may specify a threshold for the hinge angle 906, such as, for example, 45, 60, 75, 90, 105, 120, 135, 150, 165, 180, 195, 210, 225, 240, 255, 270, 285, 300, 315, 330, or 345 degrees. To illustrate, assume the threshold is 180 degrees or less. When the hinge angle between the display devices 102, 104 is approximately 180 degrees or less, the user 902 may, for example, be using the computing device in the extended display mode, as illustrated in FIG. 7. Because the content 502 spans both of the display devices 102, 104, in extended display mode, perceived color variations between the display devices 102, 104 may adversely impact the user's experience. If the hinge angle 906 does not satisfy the threshold (e.g., the angle 906 is greater than 180 degrees), then the user may not perceive a significant color difference between the display devices 102, 104 because of relatively large hinge angle, and adjustments to reduce (or eliminate) a perceived color difference may not be performed. If the hinge angle 906 satisfies the threshold (e.g., the angle 906 is less than or equal to the threshold of 180 degrees), then the user may perceive sufficient color differences between the display devices 102, 104 that the computing device 100 may perform adjustments to reduce (or eliminate) the perceived color differences.

At 1010, an amount of ambient light, an ambient temperature, and a color associated with each display device may be determined. For example, in FIG. 1, the computing device 100 may use ALS data received from the ALS 162(1), 162(2) to determine an amount of ambient light associated with each of the display devices 102, 104, respectively. The computing device 100 may use ambient temperature data received from the temperature sensors 160(1), 160(2) to determine an ambient temperature associated with each of the display devices 102, 104, respectively. The computing device 100 may use color data received from the color sensors 164(1), 164(2) to determine the perceived colors associated with the display devices 102, 104, respectively.

At 1012, a determination may be made whether to adjust the parameters associated with one or both of the display devices to prolong battery life. In response to determining, at 1012, that "yes" the parameters are to be adjusted to prolong battery life, then the process may proceed to 1014, where the parameters may be adjusted to prolong battery life, and the process may proceed to 1002. For example, in FIG. 1, the CPU 112 may determine whether the computing device 100 is being powered by the battery 154 or by external power received via the power input 150. If the computing device 100 is being powered by external power received via the power input 150, then the process may proceed to 1016. If the computing device 100 is being powered by the battery 154, then the CPU 112 may determine whether the user has specified a setting to prolong battery life or whether the user desires that the perceived colors displayed by the display devices 102, 104 closely match, even if battery life is shortened as a result. If the CPU 112 determines that the user has expressed a preference to prolong battery life, e.g., the computing device 100 is being powered by the battery 154 and the user desires to prolong battery life (even if prolonging battery life results in perceivable color differences between the display devices 102, 104), then the CPU 112 may adjust the parameters of the one or both of the display devices 102, 104 to prolong battery life. In some cases, if adjustments may cause an increase in power consumption by the display devices 102, 104, no adjustments may be made to the display devices 102, 104, to prolong battery life.

In response to determining, at 1012, that "no" battery life is not to be prolonged, then the process may proceed to 1016, where adjustments to the color parameters (e.g., gamma, chroma, luma, and the like) of one or both display devices may be determined. At 1018, the adjustments (e.g., determined at 1016) may be applied to one or both of the display devices, and the process may proceed to 1002. For example, in FIG. 1, the CPU 112 may determine that (1) the computing device 100 is being powered by external power received via the power input 150, or (2) the computing device 100 is being powered by the battery 154 and the user has specified that the perceived colors displayed by the display devices 102, 104 closely match, even if battery life is shortened as a result. In this example, the CPU 112 may use the sensor data from the ALS 162(1), 162(2), the temperature sensors 160(1), 160(2), and the color sensors 164(1), 164(2) to determine which parameters (e.g., gamma, chroma, luma, and the like) of the display devices 102, 104 to adjust to reduce (or eliminate) perceived differences between the display device 102 and the display device 104. The CPU 112 may adjust the parameters of one or both display devices 102, 104 to reduce (or eliminate) perceived differences between the display device 102 and the display device 104.

In some cases, to reduce the amount of time to reduce (or eliminate) color differences between two (or more) display devices, one or more gamma lookup tables may be used. Each gamma lookup table may include pre-calculated values that may be used to color correct one of the display devices 102, 104 to closely match in appearance the other of the display devices 102, 104. By pre-calculating the gamma values and looking up the values in a table, the computing device 100 can perform a simple lookup in table rather than evaluating complex mathematical equations in real-time to determine gamma values. Using lookup tables (e.g., for gamma, chroma, and/or luma) may reduce power consumption when determining gamma, chroma, and/or luma values to reduce differences between display devices. For example, a low power CPU may be used because the CPU merely performs a lookup. In contrast, if the CPU were to perform complex mathematical (e.g., floating point) calculations to determine gamma, chroma, and/or luma values, the CPU may consumer more power, thereby reducing battery life.

The gamma level may be used to brighten or darken content displayed by the display devices 102, 104. Adjusting the gamma level changes brightness without shifting the 0 and 255 end points. Thus, adjusting the gamma level may not create clipping and does not cause a shift of dynamic range. If conserving battery life is more important than the quality of the display, then the brightness of the display device that appears brighter may be reduced to match the brightness of the display device that appears less bright. If conserving battery life is less important than the quality of the display, then the brightness of the display device that appears less bright may be increased to match the display device that appears brighter. Examples of Gamma lookup tables, Table 1 and Table 2, are provided below. An output device, such as the display devices 102, 104, may use Table 1 or Table 2 to lookup gamma. Which of the tables is used depends on whether prolonging battery life has the highest priority or providing a vivid and bright display has the highest priority. Thus, the display devices 102, 104 can read Tables 1 and 2 to discard gamma (e.g., to convert and restore linear data prior to displaying it). Thus, even if the CPU 112 does not have the capability to perform floating point multiply and divide, the CPU 112 can perform gamma decoding using Tables 1 and 2. Reading Tables 1 and 2 can be performed quickly even by a relatively slow processor, and does not require the computing device 100 to evaluate complex mathematical equations for thousands or millions of pixels. The manufacturer of the computing device 100 may specify a particular gamma level for each display device. Tables 1 and 2 assume that the manufacturer specifies a Gamma 2.2 level. Of course, different manufacturers may specify different gamma levels (e.g., Gamma 2.0, or the like).

For example, a lookup may be performed as follows. If one display has a gamma of 93, Table 1 may be used to look up row "90:" and col. 3 to retrieve the gamma value 28 or Table 2 may be used to look up row "90:" and col. 3 to retrieve the gamma value 161. Gamma value 28 may be used to reduce brightness of one display (to match the other display) when conserving battery life takes priority while gamma value 161 may be used to increase the brightness of one display (to match the other display) when providing bright, vivid displays takes priority. In some cases, a gamma table may be created for a particular difference range for each of Red, Green, and Blue (RGB). For example, as the user opens up the computing device 100 to increase the hinge angle between the display devices 102, 104, the amount of the hinge angle may determine how much difference there is in the gamma between the display devices 102, 104, and therefore determine which particular gamma table is used. In some cases, at least a portion of the gamma lookup tables may be calculated by the processor of the computing device 100 while the computing device is being moved (e.g., re-oriented). After the computing device 100 determines (based on the sensor data) that the computing device 100 is no longer being moved, the computing device may wait a predetermined period of time (e.g., N seconds, where N>0), before using one of the gamma lookup tables to reduce a difference in appearance between the display devices 102, 104. While waiting for the computing device 100 to stop moving for at least the predetermined amount of time, the computing device 100 may calculate the gamma lookup tables. The gamma lookup tables may continue to be used for minor changes in orientation and/or hinge angle. When a major change (e.g., greater than threshold amount) in orientation or hinge angle is detected, new gamma lookup tables may be calculated.

TABLE 1

8-bit gamma Look Up Table for Decoding
Gamma 2.2 address: Linear output

|  | Col. 0 | Col. 1 | Col. 2 | Col. 3 | Col. 4 | Col. 5 | Col. 6 | Col. 7 | Col. 8 | Col. 9 |
|---|---|---|---|---|---|---|---|---|---|---|
| 0: | 0 | 0 | 0 | 0 | 0 | 0 | 0 | 0 | 0 | 0 |
| 10: | 0 | 0 | 0 | 0 | 0 | 1 | 1 | 1 | 1 | 1 |
| 20: | 1 | 1 | 1 | 1 | 1 | 2 | 2 | 2 | 2 | 2 |
| 30: | 2 | 2 | 3 | 3 | 3 | 3 | 3 | 4 | 4 | 4 |
| 40: | 4 | 5 | 5 | 5 | 5 | 6 | 6 | 6 | 6 | 7 |
| 50: | 7 | 7 | 8 | 8 | 8 | 9 | 9 | 9 | 10 | 10 |
| 60: | 11 | 11 | 11 | 12 | 12 | 13 | 13 | 13 | 14 | 14 |
| 70: | 15 | 15 | 16 | 16 | 17 | 17 | 18 | 18 | 19 | 19 |
| 80: | 20 | 20 | 21 | 22 | 22 | 23 | 23 | 24 | 25 | 25 |
| 90: | 26 | 26 | 27 | 28 | 28 | 29 | 30 | 30 | 31 | 32 |
| 100: | 33 | 33 | 34 | 35 | 35 | 36 | 37 | 38 | 39 | 39 |
| 110: | 40 | 41 | 42 | 43 | 43 | 44 | 45 | 46 | 47 | 48 |
| 120: | 49 | 49 | 50 | 51 | 52 | 53 | 54 | 55 | 56 | 57 |
| 130: | 58 | 59 | 60 | 61 | 62 | 63 | 64 | 65 | 66 | 67 |
| 140: | 68 | 69 | 70 | 71 | 73 | 74 | 75 | 76 | 77 | 78 |
| 150: | 79 | 81 | 82 | 83 | 84 | 85 | 87 | 88 | 89 | 90 |
| 160: | 91 | 93 | 94 | 95 | 97 | 98 | 99 | 100 | 102 | 103 |
| 170: | 105 | 106 | 107 | 109 | 110 | 111 | 113 | 114 | 116 | 117 |
| 180: | 119 | 120 | 121 | 123 | 124 | 126 | 127 | 129 | 130 | 132 |
| 190: | 133 | 135 | 137 | 138 | 140 | 141 | 143 | 145 | 146 | 148 |
| 200: | 149 | 151 | 153 | 154 | 156 | 158 | 159 | 161 | 163 | 165 |
| 210: | 166 | 168 | 170 | 172 | 173 | 175 | 177 | 179 | 181 | 182 |
| 220: | 184 | 186 | 188 | 190 | 192 | 194 | 196 | 197 | 199 | 201 |
| 230: | 203 | 205 | 207 | 209 | 211 | 213 | 215 | 217 | 219 | 221 |
| 240: | 223 | 225 | 227 | 229 | 231 | 234 | 236 | 238 | 240 | 242 |
| 250: | 244 | 246 | 248 | 251 | 253 | 255 |  |  |  |  | for (i = 0; i <= 255; i++) { table[i] = Math.round(Math.pow(i/255, 2.2)*255); }

TABLE 2

8-bit gamma Look Up Table for Encoding
Gamma 2.2 address: Linear output

|  | Col. 0 | Col. 1 | Col. 2 | Col. 3 | Col. 4 | Col. 5 | Col. 6 | Col. 7 | Col. 8 | Col. 9 |
|---|---|---|---|---|---|---|---|---|---|---|
| 0: | 0 | 21 | 28 | 34 | 39 | 43 | 46 | 50 | 53 | 56 |
| 10: | 59 | 61 | 64 | 66 | 68 | 70 | 72 | 74 | 76 | 78 |
| 20: | 80 | 82 | 84 | 85 | 87 | 89 | 90 | 92 | 93 | 95 |
| 30: | 96 | 98 | 99 | 101 | 102 | 103 | 105 | 106 | 107 | 109 |
| 40: | 110 | 111 | 112 | 114 | 115 | 116 | 117 | 118 | 119 | 120 |
| 50: | 122 | 123 | 124 | 125 | 126 | 127 | 128 | 129 | 130 | 131 |
| 60: | 132 | 133 | 134 | 135 | 136 | 137 | 138 | 139 | 140 | 141 |
| 70: | 142 | 143 | 144 | 144 | 145 | 146 | 147 | 148 | 149 | 150 |
| 80: | 151 | 151 | 152 | 153 | 154 | 155 | 156 | 156 | 157 | 158 |
| 90: | 159 | 160 | 160 | 161 | 162 | 163 | 164 | 164 | 165 | 166 |
| 100: | 167 | 167 | 168 | 169 | 170 | 170 | 171 | 172 | 173 | 173 |

TABLE 2-continued 8-bit gamma Look Up Table for Encoding
Gamma 2.2 address: Linear output

|      | Col. 0 | Col. 1 | Col. 2 | Col. 3 | Col. 4 | Col. 5 | Col. 6 | Col. 7 | Col. 8 | Col. 9 |
|------|--------|--------|--------|--------|--------|--------|--------|--------|--------|--------|
| 110: | 174    | 175    | 175    | 176    | 177    | 178    | 178    | 179    | 180    | 180    |
| 120: | 181    | 182    | 182    | 183    | 184    | 184    | 185    | 186    | 186    | 187    |
| 130: | 188    | 188    | 189    | 190    | 190    | 191    | 192    | 192    | 193    | 194    |
| 140: | 194    | 195    | 195    | 196    | 197    | 197    | 198    | 199    | 199    | 200    |
| 150: | 200    | 201    | 202    | 202    | 203    | 203    | 204    | 205    | 205    | 206    |
| 160: | 206    | 207    | 207    | 208    | 209    | 209    | 210    | 210    | 211    | 212    |
| 170: | 212    | 213    | 213    | 214    | 214    | 215    | 215    | 216    | 217    | 217    |
| 180: | 218    | 218    | 219    | 219    | 220    | 220    | 221    | 221    | 222    | 223    |
| 190: | 223    | 224    | 224    | 225    | 225    | 226    | 226    | 227    | 227    | 228    |
| 200: | 228    | 229    | 229    | 230    | 230    | 231    | 231    | 232    | 232    | 233    |
| 210: | 233    | 234    | 234    | 235    | 235    | 236    | 236    | 237    | 237    | 238    |
| 220: | 238    | 239    | 239    | 240    | 240    | 241    | 241    | 242    | 242    | 243    |
| 230: | 243    | 244    | 244    | 245    | 245    | 246    | 246    | 247    | 247    | 248    |
| 240: | 248    | 249    | 249    | 249    | 250    | 250    | 251    | 251    | 252    | 252    |
| 250: | 253    | 253    | 254    | 254    | 255    | 255    |        |        |        |        | for (i = 0; i <= 255; i++) { table[i]= Math.round(Math.pow(i/255, 1/2.2)*255); }

FIG. 11 is a flowchart of a process that includes determining an orientation of a computing device according to some embodiments. The process 1100 may be performed by software instructions and/or firmware instructions stored in the memory 116 and executed by the CPU 112 of the computing device 100 of FIG. 1.

At 1102, sensor data may be received from multiple sensors. At 1104, an orientation of the computing device may be determined (e.g., based on the sensor data). For example, in FIG. 1, the CPU 112 may receive sensor data from one or more of the sensors 146, 148, 162, 164. Based on the sensor data, the CPU 112 may determine whether the computing device 100 is being moved (e.g., from a current orientation to a new orientation). If the CPU 112 determines that the computing device 100 is being moved, the CPU 112 may monitor the sensor data to determine when the computing device 100 stops moving and determine a current orientation of the computing device 100 based on the sensor data.

At 1106, additional sensor data (e.g., an amount of ambient light, an ambient temperature, and color data associated with each display device) may be received from a first set of sensors associated with a first display device and a second set of sensors associated with the second display device. For example, in FIG. 1, the computing device 100 may use ALS data received from the ALS 162(1), 162(2) to determine an amount of ambient light associated with each of the display devices 102, 104, respectively. The computing device 100 may use temperature data received from the ambient temperature sensors 160(1), 160(2) to determine an ambient temperature associated with each of the display devices 102, 104, respectively. The computing device 100 may use color data received from the color sensors 164(1), 164(2) to determine the perceived colors associated with the display devices 102, 104, respectively.

At 1108, a determination may be made whether the user (or the manufacturer) of the computing device has specified a preference regarding whether to extend battery life or whether to reduce (or eliminate) perceived color differences. In response to determining, at 1108, that extending battery life is preferred to reducing color differences, the process may proceed to 1102. In response to determining, at 1108, that reducing color differences is preferred to extending battery life, the process may proceed to 1110. For example, in FIG. 1, if the computing device is only being powered by the battery 154, then reducing perceived color differences between the display devices 102, 104 may result in increased power consumption for one or both of the display devices 102, 104, thereby shortening battery life. A default setting of the manufacturer may specify that if the computing device 100 is being powered by the battery 154 and the battery 154 is not being charged by the charger 152, then extending the life of the battery 154 (e.g., extending how long the computing device 100 can operate without the battery 154 being re-charged) is preferred (e.g., takes priority) over reducing any perceived color differences between the display devices 102, 104. A user may provide a user-specified setting to override the default setting, e.g., to give priority to reducing any perceived color differences between the display devices 102, 104 even if the computing device 100 is being powered by the battery 154 and the battery 154 is not being charged by the charger 152. Thus, the user may prefer to reduce (or eliminate) perceived color differences between the display devices 102, 104 even if reducing the perceived color differences results in increased power consumption and shorter battery life. If an external power source (e.g., A/C to D/C power supply) is providing power to the computing device 100 and charging the battery 154 (e.g., via the power input 150) then the process may proceed to 1110 because reducing perceived color differences does not impact battery life.

At 1110, a determination may be made whether a hinge angle (e.g., an angle of the first display device relative to the second display device) satisfies a predetermined threshold. If a determination is made, at 1110, that the hinge angle does not satisfy the predetermined threshold, then the process may proceed to 1102. If a determination is made, at 1110, that the hinge angle satisfies the predetermined threshold, then the process may proceed to 1112. For example, in FIG. 9, the user (or the manufacturer of the computing device) may specify a threshold for the hinge angle 906, such as, for example, 180 degrees or less. When the hinge angle between the display devices 102, 104 is approximately 180 degrees or less, perceived color differences between the display devices 102, 104 may adversely impact the user's experience. If the hinge angle 906 does not satisfy the threshold (e.g., the angle 906 is greater than the threshold of 180 degrees), then the user may not perceive a significant color difference between the display devices 102, 104 (e.g., due to the relative large hinge angle) and adjustments to reduce (or eliminate) a perceived color difference may not be performed. If the hinge angle 906 satisfies the threshold (e.g., the angle 906 is less than or equal to the threshold of 180 degrees), then the user may perceive sufficient color differences between the display devices 102, 104 that the computing device 100 may perform adjustments to reduce (or eliminate) the perceived color differences.

At 1112, color adjustments (e.g., to reduce color differences between the two display devices) may be determined for at least one of the display devices. At 1114, the parameters may be adjusted. At 1116, differences in perceived colors between the two display devices may be reduced. For example, in FIG. 1, the computing device 100 may determine adjustments to the color parameters (e.g., gamma, chroma, luma, and the like) of one or both display devices may be determined. To illustrate, the sensor data from the ALS 162(1), 162(2), the temperature sensors 160(1), 160(2), and the color sensors 164(1), 164(2) may be used to determine which parameters (e.g., gamma, chroma, luma, and the like) of one or both display devices 102, 104 to adjust, to reduce (or eliminate) perceived differences between the display device 102 and the display device 104. The computing device 100 may adjust the parameters of one or both display devices 102, 104 to reduce (or eliminate) perceived differences between the display device 102 and the display device 104. In some cases, gamma values may be pre-calculated and used to create and store one or more gamma lookup tables in a memory (e.g., RAM or ROM) of the computing device 100. During run-time, the computing device 100 may use one of the gamma lookup tables to determine which gamma value to apply to one or both of the display devices 102, 104 to reduce (or eliminate) perceived color differences between the display devices 102, 104. Performing a lookup in the gamma lookup table may be significantly faster than performing complex mathematical computations during real-time.

Figure 12:
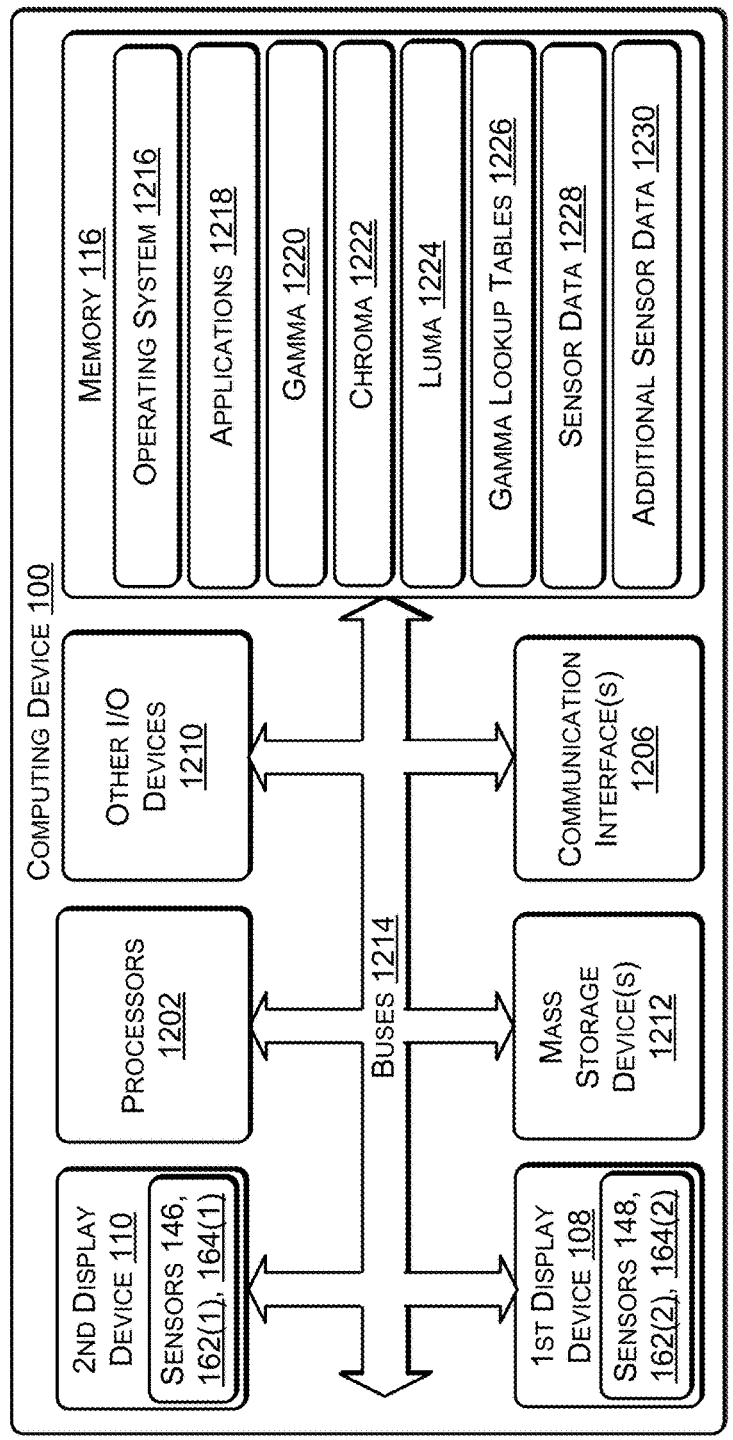
FIG. 12 illustrates an example configuration of a computing device that can be used to implement the systems and techniques described herein.

FIG. 12 illustrates an example configuration of the computing device 100 of FIG. 1 that can be used to implement the systems and techniques described herein. The computing device 100 may include one or more processors 1202 (e.g., the CPU 112 and the GPU 114 of FIG. 1), the memory 116, communication interfaces 1206 (e.g., including the I/O ports 120), the display devices 108, 110, other input/output (I/O) devices 1210 (e.g., keyboard, trackball, and the like, such as the additional components 144), and one or more mass storage devices 1212 (e.g., including the memory 116), configured to communicate with each other, such as via one or more system buses 1214 (e.g., including the data bus 128, 130) or other suitable connections. While a single system bus is illustrated for ease of understanding, it should be understood that the system buses 1214 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1202 are one or more hardware devices that may include a single processing unit or a number of processing units, all of which may include single or multiple computing units or multiple cores. The processors 1202 may include the GPU 114 integrated into the CPU 112 or the GPU 114 may be a separate processor device from the CPU 112. The processors 1202 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1202 may be configured to fetch and execute computer-readable instructions stored in the memory 116, mass storage devices 1212, or other computer-readable media.

Memory 116 and mass storage devices 1212 are examples of computer storage media (e.g., memory storage devices) for storing instructions that can be executed by the processors 1202 to perform the various functions described herein. For example, memory 116 may include both volatile memory and non-volatile memory (e.g., RAM, ROM, or the like) devices. Further, mass storage devices 1212 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1212 may be collectively referred to as memory or computer storage media herein, and may be any type of non-transitory media capable of storing computer-readable, processor-executable program instructions as computer program code that can be executed by the processors 1202 as a particular machine configured for carrying out the operations and functions described in the implementations herein.

The computing device 100 may also include one or more communication interfaces 1206 for exchanging data via a network. The communication interfaces 1206 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1206 can also provide communication with external storage, such as a storage array, network attached storage, storage area network, the cloud storage 232, or the like.

The display devices 102, 104 may be located in the housings 108, 110, respectively, and may be connected using one or more hinges (e.g., the hinges 106 of FIG. 1). The hinges may enable each display device to be placed at an angle between about 0 and about 360 relative to the other display device. For example, the display devices 108, 110 may be used for displaying information and images to users. Other I/O devices 1210 may be devices that receive various inputs from a user and provide various outputs to the user, and may include a keyboard, a touchpad, a mouse, a printer, audio input/output devices, and so forth.

The computer storage media, such as memory 116 and mass storage devices 1212, may be used to store software and data. For example, the computer storage media may be used to store an operating system 1216, one or more applications 1218, gamma 1220, chroma 1222, luma 1224, gamma lookup tables 1226 (e.g., such as, for example, Tables 1 and 2 above), sensor data 1228, and additional sensor data 1230. The sensor data 1230 and the additional sensor data 1230 may include data captured by one or more of the sensors 146, 148, 162, 164. The gamma 1220, the chroma 1222, and the luma 1224 values may be determined based on the sensor data 1228 or the additional sensor data 1230. The gamma 1220, the chroma 1222, and the luma 1224 values may be used to make adjustments to one or both of the display devices 108, 110 to reduce (or eliminate) perceived color differences.

The memory 116 may be used to store user profiles 1232(1) to 1232(N) (where N>0), with N representing the number of unique users using the computing device 100. Each user profile 1232(N) may include one or more device orientations 1234(1) to 1234(M) (M>0). Each of the device orientations 1234(1) to 1234(M) may have a corresponding user position 1236(1) to 1236(M) and content routing and rotation data 1238(1) to 1238(M). For example, if the computing device 100 determines that a current device orientation matches the device orientation 1234(M), then the computing device 100 may determine where the user is positioned relative to the computing device by retrieving the corresponding user position 1236(M) and route and rotate content based on the corresponding content routing and rotation 1238(M).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by a computing device comprising a first display device coupled to a second display device by one or more hinges, that the computing device has moved from a first orientation to a second orientation, wherein the one or more hinges enable the first display device to be placed at an angle between about 0 degrees to about 360 degrees relative to the second display device;
   receiving, by the computing device, first ambient light data from a first set of ambient light sensors associated with the first display device;
   receiving, by the computing device, second ambient light data from a second set of ambient light sensors associated with the second display device;
   receiving, by the computing device, first temperature data from a first set of temperature sensors associated with the first display device;
   receiving, by the computing device, second temperature data from a second set of temperature sensors associated with the second display device;
   receiving, by the computing device, first color data from a first set of color sensors associated with the first display device;
   receiving, by the computing device, second color data from a second set of color sensors associated with the second display device;
   determining, by the computing device, that the computing device is receiving power from an external power source;
   determining, by the computing device, first color adjustments based at least in part on:
   the first ambient light data;
   the second ambient light data;
   the first temperature data;
   the second temperature data;
   the first color data; and
   the second color data;
   performing, by the computing device, the first color adjustments to at least one of the first display device or the second display device;
   reducing, by the computing device, a difference in a perceived color between the first display device and the second display device based on the first color adjustments;
   determining that the computing device has moved from the second orientation to a third orientation;
   performing no additional color adjustments to the first display device and to the second display device based at least in part on determining that an angle between the first display device and the second display device does not satisfy a predetermined threshold; and
   performing second color adjustments to the first display device and to the second display device based at least in part on determining that the angle between the first display device and the second display device satisfies the predetermined threshold.

2. The method of claim 1, wherein:
   the first color data includes a first intensity value, a first chroma value, and a first hue value associated with the first display device; and
   the second color data includes a second intensity value, a second chroma value, and a second hue value associated with the second display device.

3. The method of claim 1, wherein:
   the predetermined threshold is specified by either a manufacturer of the computing device or a user of the computing device.

4. The method of claim 1, wherein performing the first color adjustments comprises:
   retrieving a gamma value from a gamma lookup table; and
   applying the gamma value to one of the first display device or the second display device.

5. The method of claim 1, further comprising:
determining that the computing device has moved from the third orientation to a fourth orientation; and
determining that the computing device is receiving power from a battery.

6. The method of claim 5, further comprising:
determining that a setting of the computing device indicates to prolong battery life; and
performing no additional color adjustments to the first display device and to the second display device.

7. The method of claim 5, further comprising:
determining that a setting of the computing device indicates to reduce a perceived color differences between the first display device and the second display device; and
performing third color adjustments to the first display device and to the second display device; and
reducing the perceived color differences between the first display device and the second display device based on performing the third color adjustments.

8. A computing device comprising:
a first display device;
a second display device;
one or more hinges coupling the first display device to the second display device, wherein the one or more hinges enable the first display device to be placed at an angle between about 0 degrees to about 360 degrees relative to the second display device;
a first set of ambient light sensors, a first set of temperature sensors, and a first set of color sensors associated with the first display device;
a second set of ambient light sensors, a second set of temperature sensors, and a second set of color sensors associated with the second display device;
one or more processors;
one or more non-transitory computer readable media storing instructions executable by the one or more processors to perform operations comprising:
  determining that the computing device has been moved from a first orientation to a second orientation;
  receiving first ambient light data from the first set of ambient light sensors;
  receiving second ambient light data from the second set of ambient light sensors;
  receiving first temperature data from the first set of temperature sensors;
  receiving second temperature data from the second set of temperature sensors;
  receiving first color data from the first set of color sensors;
  receiving second color data from the second set of color sensors;
  determining that power is being received from an external power source;
  determining first color adjustments based at least in part on:
    the first ambient light data;
    the second ambient light data;
    the first temperature data;
    the second temperature data;
    the first color data; and
    the second color data;
  performing the first color adjustments to at least one of the first display device or the second display device;
  reducing a difference in a perceived color between the first display device and the second display device based on the first color adjustments;
  determining that the computing device has moved from the second orientation to a third orientation;
  performing no additional color adjustments to the first display device and to the second display device based at least in part on determining that an angle between the first display device and the second display device does not satisfy a predetermined threshold; and
  performing second color adjustments to the first display device and to the second display device based at least in part on determining that the angle between the first display device and the second display device satisfies the predetermined threshold.

9. The computing device of claim 8, wherein performing the first color adjustments comprises adjusting at least one of a chroma, a gamma, or a luma of at least one of the first display device or the second display device.

10. The computing device of claim 8, wherein performing the first color adjustments comprises:
retrieving a gamma value from a gamma lookup table; and
applying the gamma value to one of the first display device or the second display device.

11. The computing device of claim 8, wherein:
the predetermined threshold is specified by either a manufacturer of the computing device or a user of the computing device.

12. The computing device of claim 8, wherein:
the first color data includes a first intensity value, a first chroma value, and a first hue value associated with the first display device; and
the second color data includes a second intensity value, a second chroma value, and a second hue value associated with the second display device.

13. The computing device of claim 8, further comprising:
determining that the computing device has moved from the second orientation to a third orientation;
determining that the computing device is receiving power from a battery; and
reducing a perceived color difference between the first display device and the second display device based on performing third color adjustment to at least one of the first display device or the second display device.

14. One or more non-transitory computer-readable media storing instructions that are executable by one or more processors to perform operations comprising:
determining that a computing device comprising a first display device coupled to a second display device by one or more hinges, has been moved from a first orientation to a second orientation, wherein the one or more hinges enable the first display device to be placed at an angle between about 0 degrees to about 360 degrees relative to the second display device;
receiving first ambient light data from a first set of ambient light sensors associated with a first display device;
receiving second ambient light data from a second set of ambient light sensors associated with a second display device;
receiving first temperature data from a first set of temperature sensors associated with a first display device;
receiving second temperature data from a second set of temperature sensors associated with a second display device;
receiving first color data from a first set of color sensors associated with a first display device;

receiving second color data from a second set of color sensors associated with a second display device;

determining that power is being received from an external power source;

determining one or more color adjustments based at least in part on:
  the first ambient light data;
  the second ambient light data;
  the first temperature data;
  the second temperature data;
  the first color data; and
  the second color data;

performing the first color adjustments to at least one of the first display device or the second display device;

reducing a difference in at least one perceived color between the first display device and the second display device based on the first color adjustments;

determining that the computing device has moved from the second orientation to a third orientation;

performing no additional color adjustments to the first display device and to the second display device based at least in part on determining that an angle between the first display device and the second display device does not satisfy a predetermined threshold; and performing second color adjustments to the first display device and to the second display device based at least in part on determining that the angle between the first display device and the second display device satisfies the predetermined threshold.

15. The one or more non-transitory computer-readable media of claim 14, wherein performing the first color adjustments comprises:
  retrieving a gamma value from a gamma lookup table; and
  applying the gamma value to one of the first display device or the second display device.

16. The one or more non-transitory computer-readable media of claim 14, wherein performing the first color adjustments comprises:
  adjusting at least one of a chroma, a gamma, or a luma of at least one of the first display device or the second display device.

17. The one or more non-transitory computer-readable media of claim 14, wherein:
  the predetermined threshold is specified by either a manufacturer of the computing device or a user of the computing device.

18. The one or more non-transitory computer-readable media of claim 14, wherein:
  the first color data includes a first intensity value, a first chroma value, and a first hue value associated with the first display device; and
  the second color data includes a second intensity value, a second chroma value, and a second hue value associated with the second display device.

19. The one or more non-transitory computer-readable media of claim 14, the operations further comprising:
  determining that the computing device is receiving power from a battery;
  determining that a setting of the computing device indicates to prolong a life of the battery; and
  performing no additional color adjustments to the first display device and to the second display device.

20. The one or more non-transitory computer-readable media of claim 14, the operations further comprising:
  determining that a setting of the computing device indicates to reduce a perceived color differences between the first display device and the second display device;
  performing third color adjustments to the first display device and to the second display device; and
  reducing the perceived color differences between the first display device and the second display device based on performing the third color adjustments.

* * * * *